US006621789B1

(12) United States Patent
Missett

(10) Patent No.: US 6,621,789 B1
(45) Date of Patent: Sep. 16, 2003

(54) PROTECTION SWITCHING METHOD AND APPARATUS FOR COAXIAL CABLE-BASED TELEPHONY SYSTEM (MEDIASPAN)

(75) Inventor: Shaun N. Missett, Rohnert Park, CA (US)

(73) Assignee: Alcatel USA, Plano, TX (US)

( * ) Notice: Subject to any disclaimer, the term of this patent is extended or adjusted under 35 U.S.C. 154(b) by 0 days.

(21) Appl. No.: 09/382,842

(22) Filed: Aug. 25, 1999

(Under 37 CFR 1.47)

(51) Int. Cl.[7] .................................... H04L 12/26
(52) U.S. Cl. ..................... 370/225; 370/250; 370/437
(58) Field of Search ..................... 370/216, 217, 370/218, 219, 220, 225, 226, 227, 228, 431, 437, 480, 485, 486, 489, 250, 241, 242, 244, 248, 251

(56) References Cited

U.S. PATENT DOCUMENTS 5,369,664 A * 11/1994 Takahashi et al. .......... 370/347
5,563,883 A * 10/1996 Cheng ..................... 370/449
5,586,121 A * 12/1996 Moura et al. ............... 370/276
5,881,059 A * 3/1999 Deschaine et al. .......... 370/337
5,886,988 A * 3/1999 Yun et al. ................. 370/329

OTHER PUBLICATIONS

Chow, J., et al., "A Discrete Multitone Transceiver System for HdsL Applications," IEEE Journal on Selected Areas in Communications, vol. 9, No. 6, pp. 257–266 (1993).

Gross, R., "Discrete Wavelet Multitone (DWMT) System for Digital Transmission over HFC Links", SPIE Proceedings, vol. 2609, pp. 168–175 (1995).

Aware, Inc., "wDSL Solution to Digital Carrier Service Provisioning", http://www.aware.com/technology/whitepoapers/wdsl.html (visited Nov. 24, 1998).

* cited by examiner

*Primary Examiner*—Kwang Bin Yao
(74) *Attorney, Agent, or Firm*—Richard A. Mysliwiec; V. Lawrence Sewell

(57) ABSTRACT

Protection switching method and apparatus in which a service (e.g. a call) which needs to be moved to a different communication channel can be moved without having to move other services being carried on the same channel. In a particular coaxial cable-based telephony system embodiment, a plurality of frequency division multiplexed communication channels are each sub-multiplexed (with DMT for example) to carry a plurality of sub-channels. Each larger channel is controlled by a different modem at the head end, and all channels are combined onto a single cable. If the quality of one of the sub-multiplexed channels in a first one of the larger channels degrades sufficiently, and no other sub-multiplexed channels within the same first channel of sufficient quality are available to carry the service, then that service is moved to a different second channel controlled by a different modem. Other services being carried in the first channel are not moved to other channels unless they, too, are experiencing unacceptable quality degradation.

10 Claims, 8 Drawing Sheets

PROTECTION SWITCHING METHOD AND APPARATUS FOR COAXIAL CABLE-BASED TELEPHONY SYSTEM (MEDIASPAN)

BACKGROUND OF THE INVENTION

1. Field of the Invention

The invention generally relates to a coaxial-based telephony system, and more particularly to methods and apparatus for protection switching among different frequency bands or different units of equipment in a frequency division multiplexed communication system.

2. Description of Related Art

Co-axial cable systems have been widely deployed for providing video signals, such as cable television (CATV) signals, to subscriber locations, i.e. homes or offices. Several such systems also provide telephony signals over the co-axial cables, such as signals carrying telephone calls, facsimile transmissions, Internet data communications and the like.

With systems for providing both video and telephony signals over a single co-axial cable, the single cable thereby carries both downstream signals (i.e. signals sent to the subscriber location) and upstream signals (i.e. signals sent from the subscriber location). The downstream signals include both video and telephony signals. The upstream signals typically include only telephony. In some systems, though, upstream signals additionally include upstream video signals such as may be required with interactive television systems.

Separate transmission frequencies typically are used to distinguish the downstream signals from the upstream signals, to distinguish downstream telephony signals from downstream video signals and to distinguish upstream telephony from upstream video signals, if any. Moreover, as to the telephony signals, otherwise conventional pair gain techniques may be employed to permit simultaneous transmission of two or more telephony channels both upstream and downstream to thereby permit, for example, two separate telephone conversations to proceed simultaneously using two separate telephones at the subscriber location. The signals carried on the telephony channels are typically encoded digitally for transmission using, for example, T1 framing.

When implementing such a combined video/telephony co-axial cable transmission system, a co-axial termination unit (CTU) (also sometimes referred to herein as a remote unit) may be provided at each individual subscriber location, with hundreds or perhaps thousands of CTU's connected to a single combined video/telephony co-axial cable. Each CTU is connected to the combined video/telephony co-axial cable via a tap. Each CTU is also connected both to the upstream end of a video-only co-axial cable connected into the subscriber location, and to the upstream ends of any telephone circuits that are also connected into the subscriber location. The video-only co-axial cable is typically connected to a television set, cable TV decoder unit, or video cassette recorder (VCR) at the subscriber location. Tip and ring lines of the telephone circuits are typically connected to a telephone, facsimile machine or modem at the subscriber location.

Thus the CTU provides an interface between the combined video/telephony co-axial cable and the video-only co-axial cable and separate telephone lines connected into a single subscriber location. To this end, the CTU includes components for converting radio frequency (RF) digital telephony signals received on the telephony channels of the combined video/telephony co-axial cable to analog telephone signals for coupling to the tip and ring lines of the subscriber telephone circuits. Likewise, the CTU includes components for converting analog signals received from the tip and ring circuits to digital signals modulated onto an RF carrier for transmitting over the combined video/telephony co-axial cable. A modem and a coder-decoder (CODEC) may be employed to handle the conversions for the telephony operations. Also the CTU includes circuitry for routing the video signals received from the combined video/telephony co-axial cable to the video-only co-axial cable routed into the subscriber location. The video-only co-axial cable is referred to herein as a "video-only" cable only because, in use, it carries only video signals. The video-only co-axial cable is, however, an otherwise standard co-axial cable which could carry other signals as well.

An upstream end of the combined video/telephony co-axial cable is connected via an appropriate interface system into a telephone company central office (CO) provided with switching equipment for routing telephony signals to and from the public switched telephone network (PSTN). The interface system receives telephony signals from the PSTN via the CO and also receives video signals from a suitable video source, such as a CATV service provider or a satellite dish, and combines those signals onto the combined video/telephony co-axial cable for transmission to the CTU.

In one architecture, the frequency range of 450 to 750 MHz is employed for downstream signals and the frequency range of 5 to 50 MHz is employed for upstream signals. The upstream telephony frequency range is divided up into a plurality of smaller frequency bands, each having a bandwidth of, for example, 2 MHz. The downstream telephony frequency range is divided up in a similar manner. Each 2 MHZ frequency band is further multiplexed ("sub-multiplexed"), such as by Discrete multitone (DMT) or Discrete Wavelet Multitone (DWMT) technology, so as to carry a plurality of communication channels (sometimes referred to herein as "sub-channels"). DMT and DWMT are multiplexing techniques which split bandwidth usage into sub-channels for maximum data transfer. DMT is described in J. S. Chow, J. C. Tu, and J. M. Cioffi, "A discrete multitone transceiver system for HDSL applications," IEEE Journal on Selected Areas in Communications, vol. 9, no. 6, pp. 257–266 (1993), incorporated herein by reference, and DWMT is described in Richard Gross, Michael Tzannes, Stuart Sandberg, Halil Padir, and Xuming Zhang, "Discrete Wavelet Multitone (DWMT) System for Digital Transmission over HFC Links", SPIE Proceedings, Volume 2609 (1995), incorporated herein by reference. A channel is then optimized for modulation if certain sub-channels cannot transmit data due to noise, for example. Noise problems are inherent in coaxial cable telephony in both the upstream and downstream directions, but are most acute in the upstream direction, for example, as the result of the presence of noise sources within the 5 to 50 MHz band (such as motors, washers, compressors and the like) operating near the downstream end of the co-axial cable.

An important consideration in any telephony system is the mechanism that the system uses to accommodate and avoid faulty equipment or equipment providing an unacceptably poor level of quality. Most systems implement a technique known as protection switching, in which a fault or unacceptable quality is detected and the service or services that are affected are moved, either manually or automatically, to other equipment which is providing service of sufficient quality. In the case of an RF system, quality degradation might derive not only from equipment problems, but also from external RF noise sources as mentioned above. Thus in the case of an RF system, it may be possible to remedy a quality degradation problem merely by moving an affected service to a different sub-multiplexed channel within the same frequency band. This kind of protection switching, referred to herein as intra-band or intra-channel protection switching, can be least disruptive to services in progress (such as continuing telephone calls) if the intra-band protection switching does not require any handoff of the service from one unit of equipment to another. The latter condition might exist, for example, if all the sub-channels in each 2 MHZ band are served by common component equipment (such as a common modem), but different 2 MHZ bands are served by different equipment.

If intra-band protection switching is not successful, then an RF system would next try moving the affected service(s) to a different frequency band. This kind of protection switching is referred to herein as inter-band or inter-channel protection switching. Intra-band and inter-band protection switching are also sometimes referred to herein as intra-modem and inter-modem protection switching, respectively, specifically because the embodiment described hereinafter assigns each 2 MHZ channel in a given direction to a different modem.

In the past, if inter-band protection switching was required, it would have been assumed that the entire 2 MHZ frequency band (or some unit of equipment serving the entire 2 MHZ band) was bad, and all services being carried within that frequency band would have been moved to a different band. Stated another way, in an architecture in which each 2 MHZ frequency band is served by different units of equipment, it would have been assumed that all remote units that had been served by one unit of equipment would have to be moved to another unit of equipment. One spare unit of equipment would have been provided for this purpose. This approach to inter-band protection switching involves what is known as "1×N redundancy" because one spare unit of equipment is available to protect N active units of equipment.

One problem with the 1×N approach is that maintenance is typically required in response to each inter-band protection switching event in order to isolate the problem and correct it. Otherwise, the group of N units of equipment will be left without any inter-band protection switching capability. If another inter-band protection switching event is later required and no spare equipment units are available, the affected service(s) would likely be dropped. This can be upsetting to customers, for example, who might find their telephone call suddenly disconnected.

Another problem with the 1×N redundancy approach especially in RF communication systems, is that sometimes the first protection switching event is caused by RF interference which degrades more than one 2 MHZ-wide frequency band simultaneously. In this situation only one inter-band protection switching event would be accommodated; any further inter-band protection switching required due to the same interference would result in dropped calls. Of course both of these problems could be alleviated by providing two (or more) spare units of equipment and a corresponding number of spare frequency bands per N frequency bands in use, but this solution would provide only incrementally improved protection at twice (or more) the cost.

Accordingly it would be desirable to provide an inter-band protection switching technique which provides greater redundancy than 1×N, without substantially greater cost.

SUMMARY OF THE INVENTION

In accordance with the invention, roughly described, a system is provided which implements what is essentially "M×N redundancy." That is, a service (e.g. a call) which needs to be moved to a different channel can be moved without having to move other services making use of the same channel. In an embodiment in which different channels are controlled by different units of equipment, the invention can be viewed as a technique in which when a service using a channel controlled by one unit of equipment needs to be moved to a different unit of equipment, fewer than all the other services using the first unit of equipment are moved to the second unit of equipment. It is not necessary to have a pre-assigned "spare" unit of equipment available for redundancy purposes, although that still would be possible within the inventive scheme. Instead, the redundancy scheme described herein can take advantage of spare bandwidth (in the form of spare sub-multiplexed channels) on other active units of equipment.

In one embodiment, in which telephony is carried on sub-multiplexed channels within multiplexed channels carried on a combined video/telephony co-axial cable transmission system, inter-band protection switching can take place under the control of a Terminal Control Processor (TCP) at the head end in response to messages from the equipment units responsible for respective telephony channels. In order to optimize the use of intra-band protection switching, the TCP manages assignment of coax remote units to head-end equipment units in accordance with certain leveling rules. First, the number of DS0's available for protection on any given CLUH is maximized. Second, the level of concentration on any given CLUH is minimized. Third, the number of remote units communicating with any one CLUH is minimized, and is not to exceed a predetermined number (e.g. 128).

Other aspects of the invention as well as other advantages of the invention are provided as well. Method embodiments of the invention are also provided.

DETAILED DESCRIPTION

Figure 1:
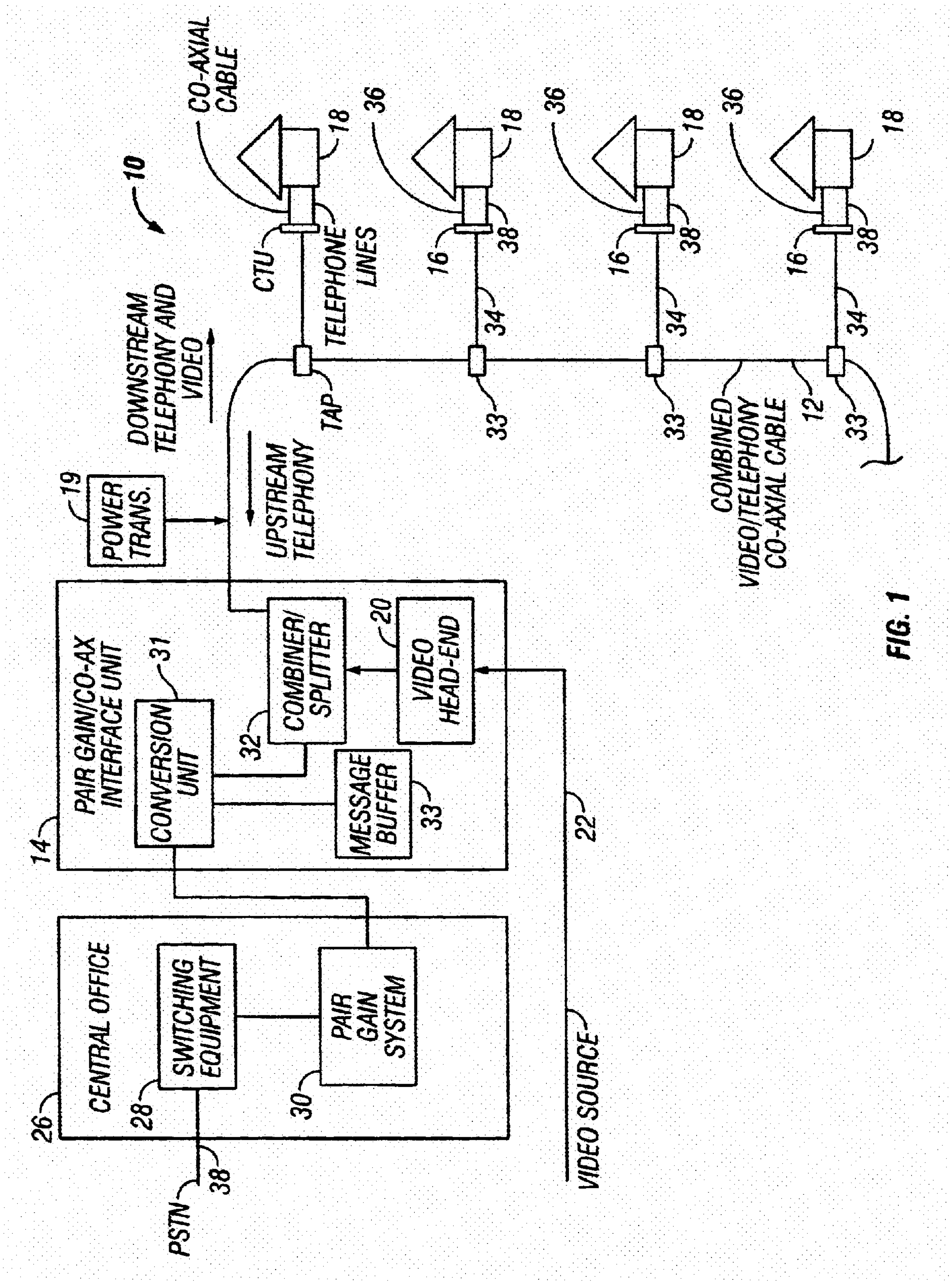
FIG. 1 is a block diagram of a system providing both telephony and video to subscriber locations using a single co-axial cable interconnecting a set of CTU's with a telephone company CO via a pair gain/co-ax interface unit.

FIG. 1 illustrates a combined video/telephony transmission system 10 having a combined video/telephony transmission co-axial cable 12 interconnecting a pair gain/co-ax interface unit 14 with a set of CTU's 16 located at respective subscriber locations 18 which may be, as shown, individual houses. Cable 12 carries downstream RF video signals from pair gain/co-ax interface unit 14 to the CTU's of the subscriber locations 18 and carries both upstream and downstream RF telephony signals between the pair gain/co-ax interface unit and the CTU's. At least two separate telephony channels are carried on cable 12 for each CTU 16 connected to cable 12, although in a different embodiment, each CTU may receive only one telephony channel or may receive more that two telephony channels. Typically, 500 to 1000 CTU's are connected to the pair gain/co-ax interface unit via cable 12. Since CTU's of numerous subscriber locations are connected to cable 12, numerous telephony channels may be simultaneously carried over the cable. Moreover numerous video channels, perhaps corresponding to various CATV channels, are also carried on cable 12. Cable 12 also carries power downstream to power the CTU's such that the CTU's need not rely on local power. The power is provided at 90 volts and is coupled into cable 12 using a power transmitter unit 19 separate from pair gain/co-ax interface unit 14. The power transmitter unit may be of the type conventionally employed by cable companies to power any co-axial cable repeaters (not shown) needed along the length of the cable.

In another embodiment, referenced occasionally herein, a remote unit takes the form of a Coax Network Unit (CNU), which is optimized to support a significantly larger number of DS0's than is a CTU. A CNU has a shelf with a variable number of pluggable remote cards, called Coax Line Units Remote (CLUR's) herein, for terminating the cable and connecting to copper pairs for further distribution.

Pair gain/co-ax interface unit 14 receives the video channels to be transmitted over cable 12 via a video head end unit 20 from a video source line 22 which is connected to a CATV service provider (not shown) or perhaps to a satellite dish (also not shown). Pair gain/co-ax interface unit 14 also receives downstream telephony signals from a PSTN line 24 (or interoffice trunk line) via a central office (CO) 26. More specifically, downstream telephony signals are routed by switching equipment 28 (such as a standard electronic, cross-bar or step-by-step switching system) to a pair gain system 30 which forwards the telephony signals on conventional pair gain loop-type channels to pair gain/co-ax interface unit 14 with one pair gain telephony channel corresponding to each subscriber telephone number of each subscriber connected via cable 12. (Although not shown, CO 26 may additionally be connected to various other subscriber locations through conventional metallic loops or other conventional connection means.)

A conversion unit 31 converts the pair gain telephony signals received from the pair gain system into RF digital signals appropriate for transmission over cable 12 and routes the converted signals to a combiner/splitter 32. The combiner/splitter combines the RF telephony channels with the RF video channels received from video source 22 and transmits the combined video/telephony channels downstream using standard multi-frequency RF transmission techniques on cable 12 at various frequencies within the range of 450 to 750 MHz. In an implementation wherein the pair gain system outputs analog pair gain signals, conversion unit 31 performs analog to digital conversions of received pair gain signals. In an implementation wherein the pair gain system outputs digital pair gain signals, perhaps using synchronous optical network (SONET) techniques, conversion unit 31 performs whatever digital signal conversions are appropriate for converting the format of the received digital pair gain signals to a format appropriate for RF transmission over co-axial cable 12. In the exemplary embodiment presently described, the received digital pair gain signals are converted to DMT-formatted or DWMT-formatted signals prior to or as part of RF transmission.

Telephony signals sent by pair gain/co-ax interface unit 14 and carried on the telephony channels over co-axial cable 12 primarily include signals representative of telephone conversations but also include various messages, such as a "ring signal" message indicating that an incoming telephone call directed to a telephone within one of the subscriber locations 18 has been received or a "pair gain test" message for initiating a pair gain test within the CTU. Such messages may be temporarily buffered within a message buffer 33 to allow the messages to be resent over co-axial cable 12 if necessary.

Each CTU 16 connected to cable 12 splits the RF video signal portion from the combined RF signal and routes the RF video signals over a respective co-axial cable 36 into the respective subscriber location for connection therein to a TV or VCR. Often, the video signals are scrambled. Only those subscribers having appropriate de-scrambler units are capable of de-scrambling and viewing the video signals. In other implementations, the CTU routes only those channels, if any, that the subscriber is authorized to receive. In such case, no de-scrambler is required.

Each CTU 16 also splits off two or more RF telephony channels from the combined signal received on cable 12, converts the digital telephony signals carried on the telephony channels to analog telephone signals and routes the analog signals over physical telephone lines 38 into the respective subscriber location. More specifically, each CTU splits off those telephony channels designated for connection to the respective subscriber location. Each telephony channel is routed onto a respective separate telephone line. In this manner, telephone calls are routed only to the intended subscriber location and only to the intended telephone line of the subscriber location to ensure that telephone conversations or other telephony communications are connected only to the appropriate parties. In the embodiment illustrated in FIG. 1, each subscriber location may receive an arbitrary number of telephony channels and so an arbitrary number of telephone lines are provided between each CTU and its respective subscriber location. In a specific embodiment described below, each subscriber location receives two telephony channels and so only two telephone lines are associated with each CTU.

Upstream telephony signals received by CTU 16 via telephone lines 38 are combined by the CTU then transmitted using DMT or DWMT within a frequency range of 5 to 50 MHz onto the respective tap line 34 then further combined onto cable 12 and routed to pair gain/co-ax interface unit 14. Combiner/splitter 32 of the pair gain/co-ax interface unit splits the upstream telephony signals onto separate pair gain lines for routing via conversion unit 31 to pair gain system 30 and ultimately to PSTN 24 via switching equipment 28. For telephone calls between two subscribers connected to the same CO, the calls typically are not routed to the PSTN, but are instead only routed by the CO between the two subscribers. Also, in other embodiments, cable 12 may additionally carry upstream video signals such as may be required for use with interactive television systems.

Figure 2:
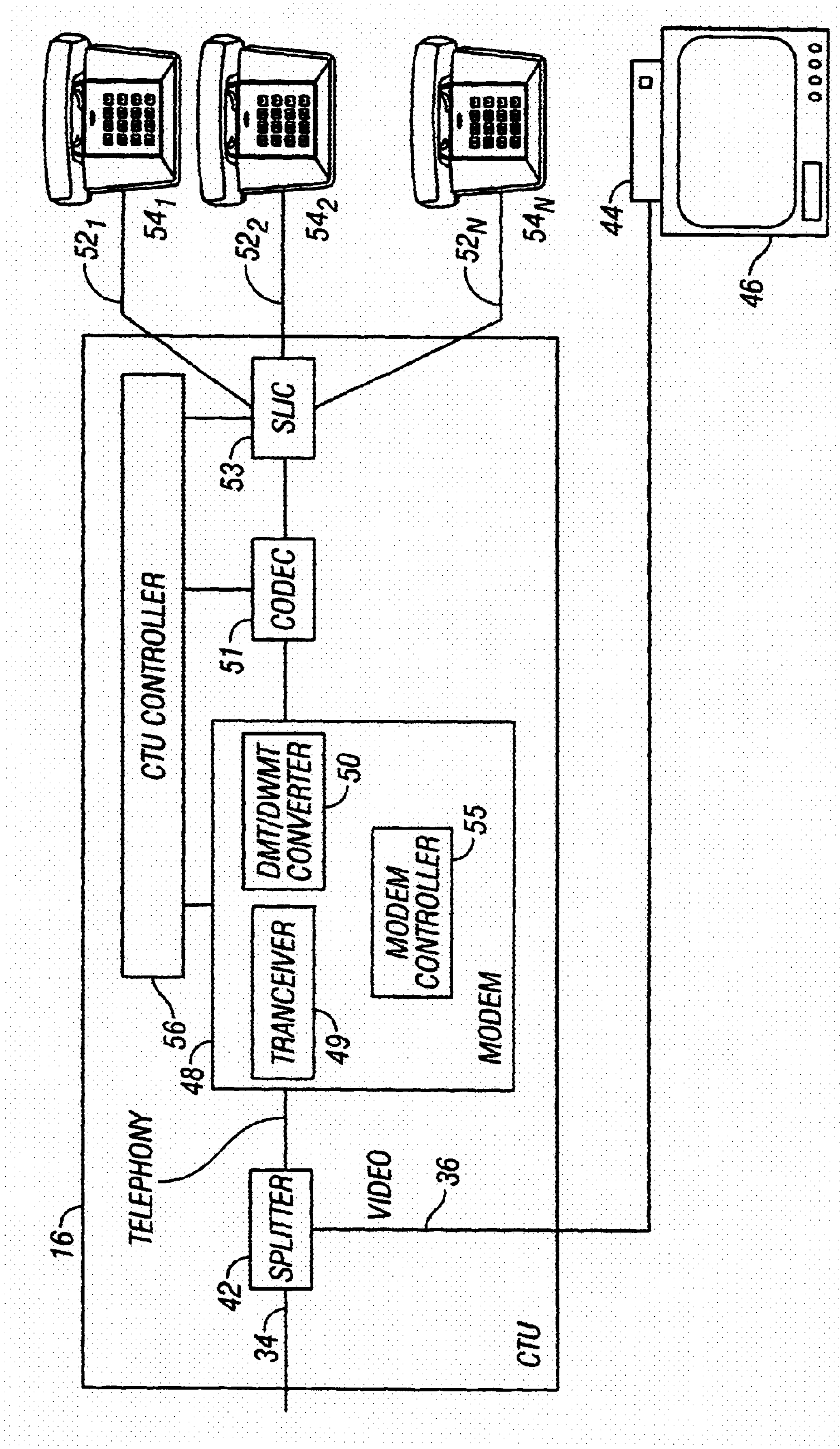
FIG. 2 is a block diagram illustrating pertinent components of one of the CTU's of the system of FIG. 1.

Pertinent components of one exemplary CTU 16 are illustrated in FIG. 2. Referring to FIG. 2, a splitter/combiner 42 receives the downstream combined video/telephony RF signals from tap line 34 and splits the RF video off for routing along coaxial cable 36 to a subscriber de-scrambler box 44 for ultimate display on television 46. RF telephony channels are routed from splitter/combiner 42 into a modem 48 which converts the RF signals of the telephony channels to internal digital telephony signals. To receive and convert the RF signals to digital telephony signals, the modem employs a transceiver 49, a DMT or DWMT converter 50, and other conventional components (not shown). The internal functions of the modem 48 are controlled by a modem controller 55. As noted above, the RF telephony signals include both telephony communications, such as digitized voice conversations, and signaling messages, such as the aforementioned "ring signals" or "pair gain test" signals.

Downstream internal digital telephony signals corresponding to telephony communications (as opposed to those corresponding to signaling messages) are routed from modem 48 to a CODEC 51 which converts the signals to analog telephone signals and routes the analog telephone signals via a subscriber line interface circuit (SLIC) 53 onto separate output telephone lines $52_1$–$52_N$ (each having separate tip and ring lines) which conduct the signals to respective telephony devices $54_1$–$54_N$ which may be telephones, as shown, or other telephony devices such as computer modems, facsimile machines, and the like. As noted above, CTU 16 receives all telephony channels carried on cable 12 (FIG. 1). Accordingly, modem 48 processes and outputs only those telephony signals intended for telephony devices 54 of the respective subscriber location as determined by examining unique routing signals provided with the telephony signals. All other telephony channels, i.e. telephony channels intended for other subscriber locations, are ignored.

Upstream analog telephony signals received by SLIC 53 along telephone lines 52 from telephony devices 54 are converted to digital signals by CODEC 51, then converted to RF signals by modem 48, and finally combined and transmitted by splitter/combiner 42 onto tap line 34 for ultimate routing to pair gain/co-ax interface unit 14 (FIG. 1).

With the arrangement shown, up to N separate telephone conversations or other telephony communication services may be conducted simultaneously each consisting of various upstream and downstream telephony signals carried over separate telephony channels.

Further with regard to downstream signals, any downstream telephony signals received by modem 48 that correspond to signaling messages are routed from modem 48 to a CTU controller 56 which controls the operation of the other components of the CTU. Exemplary messages include: the aforementioned "ring signal" message indicative of an incoming call; the "pair gain test" messages instructing the controller to initiate a pair gain test; and a "performance monitoring message" instructing the controller to initiate a performance test of the various internal components of the CTU, such as the modem and the CODEC. If the ring signal message is received, controller 56 controls SLIC 53 to output an appropriate voltage signal over the ring line of telephone line 52 connected to the subscriber telephony device to which the telephone call is directed to thereby connect the telephone call. If the performance monitor message is received, controller 56 begins monitoring the performance of various components of the CTU to, for example, verify the efficient operation of the modem and CODEC. If the pair gain test message is received, controller 56 controls pair gain test units (not shown) to initiate a pair gain test to verify the integrity of one of the telephony channels coupled into the CTU via tap line 34.

Figure 3:
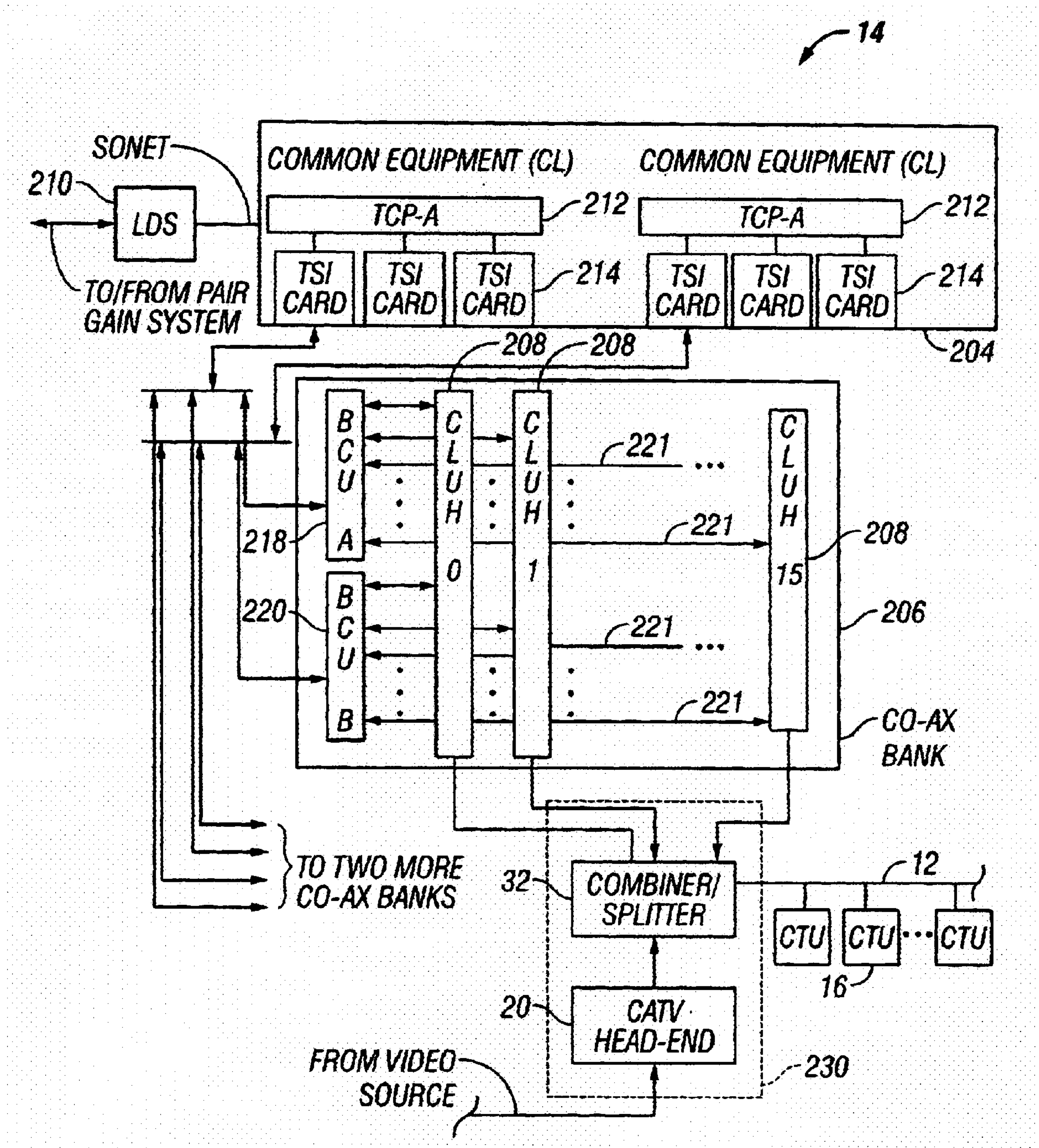
FIG. 3 is a block diagram illustrating pertinent components of a specific pair gain/co-axial interface system for use with the system of FIG. 1 for converting between digital pair gain telephony signals received from the telephone company CO and RF telephony signals carried over the co-axial cable.

FIG. 3 illustrates pertinent parts of a pair gain/co-ax interface unit 14. The pair gain/co-ax interface unit 14 is implemented as part of a LiteSpan® system, available from Alcatel USA, Plano, Tex. The pair gain/co-ax interface unit includes a common control shelf having common equipment (CE) 204 and up to nine channel bank shelves each carrying one of a number of different types of channel banks. One such channel bank is a co-axial bank 206 containing a set of up to sixteen co-ax line unit head-end (CLUH) units 208. CE 204 communicates with a pair gain system of a CO (not shown in FIG. 3) via a local digital switch (LDS) 210 using SONET techniques. CE 204 includes two terminal control processors (TCP) 212 each connected to up to three time slot interchange (TSI) cards 214. Two sets of TCP's and TSI's are provided for redundancy. The two sets are referred to herein as the A set and the B set.

Each TSI 214 supports up to three TSI cables 216 (only one of which is shown) for a total of nine TSI cables, one for each of the nine channel banks. Further redundancy may be provided by doubling the number of cables. Each TSI cable includes a 16 MHz data rate 8-bit-wide bus for each of the upstream and downstream directions for a total of 16 bits per TSI cable 216.

Within co-ax bank 206, the bi-directional A-side TSI cable is connected to an A-side bank control unit (BCU) 218 and the bi-directional B-side TSI cable is connected to a B-side BCU 220. The BCU's may be implemented using fiber bank interface units (FBIU's) as found in conventional optical network units (ONU). Each BCU functions as an interchange between the TSI cable data transmission format and a backplane bus format. Each TCP 212 can program the corresponding BCU (218 or 220) with a map of TSI buses to back plane buses.

A backplane bus 221 of co-ax bank 206 includes sixty-four individual conductors (not separately shown). Four of the conductors are connected to each of the sixteen CLUH's 208 that can be inserted into the co-ax bank 206. Of the four conductors, two (one upstream and one downstream) are connected to BCU 218 and two are connected to BCU 220. The upstream pair that connect one CLUH with one BCU are octal buses that carry eight bi-directional 4.096 Mbits/sec "subscriber buses". The eight subscriber buses are time domain multiplexed (TDM) on the respective conductor such that each conductor carries bits from all eight subscriber buses in a round-robin fashion. The bit rate for each subscriber bus is 4.096 Mbits/sec and the overall bit rate on each conductor is 16.384 MHz. Typically, only three of the subscriber buses on each conductor pair are in use, specifically buses 5–7. Note that another embodiment could use other protocols, such as an ATM or ATM-like protocol, on the backplane bus or in communication with the CE, LDS, and so on.

The active subscriber buses on each backplane conductor are further time domain multiplexed to carry up to 64 kbps data rate digitized analog signals (DS0's). Up to sixty-four of the DS0's carry conversations and the remainder are employed for control functions such as transmission of the aforementioned pair gain test control signals. In co-ax bank 206, each CLUH 208 processes the sixty-four DS0's carried on the octal backplane bus to which the CLUH is assigned. Each CLUH is pre-assigned a 2 MHz-wide RF band on the combined video/telephony co-axial cable 12 for downstream traffic and a 2 MHz-wide RF band for upstream traffic. The outputs of the CLUH's are multiplexed onto cable 12 via the combiner/splitter 32 which also receives video signals from the CATV head-end unit 20. The signals are routed downstream through the cable to a set of up to 500 or 1000 CTU's 16. Collectively, the internal components of the pair gain/co-ax interface unit 14 performed all necessary data conversions to interface the pair gain SONET signals received from LDS 210 with the RF DS0's carried over cable 12. Combiner/splitter 32 and CATV head-end unit 20 collectively form a distribution network 230 which may be entirely conventional.

Embedded Operations Channels (EOCs)

As mentioned above, several of the communication channels (sub-channels) which are available for communicating via the coaxial cable 34, carry control or signaling information rather than calls. In the downstream direction, the following facilities are provided: a Media Access Link (MAL); a Downstream Reservation Operations Link (DROL); a Downstream Modem Operations Channel (DMOC); a Downstream Media Data Link (DMDL); and a Message Waiting Link (MWL).

The Media Access Link (MAL) is transmitted only in the downstream direction and contains information needed for initialization. This is a narrow band channel that transmits the frequency information continuously on two fixed tones with 2 bits of information contained in every tone (16-QAM equivalent, 4 bits/frame). The information transmitted depends on the frame number within the superframe. A superframe consists of 31 modem frames (121 ms per modem frame), where frame 0 contains EQ reference symbols for all tones and the remaining frames are used for information transmission. There are 256 superframes per multi-superframe. Knowledge of the superframe number is needed at the subscriber to determine the proper reference symbol sent for EQ updates. The information carried on the MAL includes the following in even numbered Superframes:

Frame 0: Normal reference symbol for adaptive equalizer updates.

Frame 1: The first two bits of this field indicate whether the next superframe contains all reference symbols on the Downstream Modem Operations Channel (DMOC) to allow for a quick equalizer training of this communications channel. This is to be used after a change in RF frequency to avoid unnecessary call setup delays after tuning the RF frequency. Bits 3 and 4 contain the ranging available field indicating that the ranging tones are currently being used to range a new subscriber.

Frame 2–3: Superframe number, 8 bit field.

Frame 4–6: Start tone for Downstream Modem Operations Channel (DMOC), 10 bit field, valid numbers are 0 to 383.

Frames 8–10: Start tone for Downstream Reservation Operation Link (DROL), 10 bit field, valid numbers are 0 to 383.

Frames 12–14: Start tone for Downstream Media Data Link (DMDL), 10 bit field, valid numbers are 0 to 383.

Frames 16–17: Corresponding upstream TX frequency, 8 bit field, valid numbers are 0 to 150.

Frames 20–21: Field containing a 8 bit CRC corresponding to the data from frames 1–19.

Frames 24–30: Reference data for training the equalizer during initialization, needed to establish communication without knowledge of the multi-superframe count. The frame number (0–30) is derived/known from the timing signals transmitted from the headend. These frames are ignored once the equalizers are successfully trained during the initialization period.

In odd numbered Superframes, the MAL contains the following information:

Frame 0: Normal reference symbol for adaptive equalizer updates.

Frame 1: The first two bits of this field indicate whether the next superframe contains all reference symbols on the Downstream Modem Operations Channel (DMOC) to allow for a quick equalizer training of this communications channel. This is to be used after a change in RF frequency to avoid unnecessary call setup delays after tuning the RF frequency. Bits 3 and 4 contain ranging available field indicating that the ranging tones are currently being used to range a new subscriber.

Frame 2–3: Superframe number, 8 bit field, valid numbers are 0 to 255.

Frame 4–6: Start tone for Upstream Modem Operations Channel (UMOC), 10 bit field, valid numbers are 0 to 383.

Frames 8–10: Start tone for Upstream Reservation Operation Link (UROL), 10 bit field, valid numbers are 0 to 383.

Frames 12–14: Start tone for Upstream Media Data Link (UMDL), 10 bit field, valid numbers are 0 to 383.

Frames 16–18: Start tone for Upstream Contention Operation Link (UCOL), 10 bit field, valid numbers are 0 to 383.

Frames 20–21: Field containing a 8 bit CRC corresponding to the data from frames 1–19.

Frame 24–30: Reference data for training the equalizer during initialization, needed to establish communication without knowledge of the multi-superframe count. The frame number (0–30) is derived/known from the timing signals transmitted from the head-end. These frames are ignored once the equalizers are successfully trained during the initialization period.

The tones that are used for the Media Access link are fixed so the modem knows where to look. In one embodiment, primary and redundant MALs are assigned tones next to the ranging/timing tones. If the timing tones and/or MAL is corrupted for a given 2 MHz band, communication between the remote and head-end cannot be established. Note that the assignment of information to various frame numbers in the above tables is illustrative only; other embodiments can use other assignments.

The Downstream Reservation Operations Link (DROL) is transmitted in the downstream direction only. Only one DROL channel can be designated and there is no possibility of collision. In an embodiment, 5 tones are used for this channel with 16 QAM modulation resulting in 10 bits transmitted per frame (64 kb/s information, 8 kb/s signaling, 8 kb/s parity). All subscriber modems demodulate this channel at all times, but the modem does not interpret the data at all. The frequency location of the DROL is flexible and the start tone of the channel is given in the MAL. The DROL byte is the first byte in the payload data stream.

The downstream multi-frame alignment is carried in the signaling bits of the DROL. In addition, the DROL is a broadcast link. It is used during the start-up of a remote coax unit before the unit is assigned an unique ID and also during code downloads to remote coax units.

The Downstream Modem Operations Channel (DMOC) is transmitted in the downstream direction only and is used for internal modem to modem communications. This channel is transparent to the CTU Controller 56 (FIG. 2) and the TCP's (FIG. 3). Examples of messages in this channel include call setup data, Performance Monitoring (PM), ranging collision event, and upstream contention acknowledge. This channel requires 8 tones using 16 QAM to transmit 16 bits/frame (128 kb/s). The standard message format spans 3 frames with a 48 bit message (including CRC). All subscriber modems demodulate this channel at all times. The frequency location of the DMOC is flexible and the start tone of the channel is given in the MAL.

The Downstream Media Data Link (DMDL) is transmitted in the downstream direction only. Only one DMDL channel can be designated and there is no possibility of collision. In an embodiment, 5 tones are used for this channel with 16 QAM modulation resulting in 10 bits transmitted per frame (64 kb/s information, 8 kb/s signaling, 8 kb/s parity). The data is transmitted on a continues basis only when commanded to do so. A TX_DMDL_EN (enable) command instructs the headend modem in a CLUH to set up the DMDL channel with a specific subscriber in a manner similar to a payload DS0 setup. A TX_DMDL_DA (disable) command instructs the headend to disable transmission of the DMDL channel. Only the specified subscriber modem will demodulate this channel, but the modem does not interpret the data at all. The frequency location of the DMDL is flexible and the start tone of the channel is given in the MAL. The DMDL byte is the second byte in the payload data stream.

The DMDL can only be used after it is assigned to a specific coax remote unit. It is used when communications to a specific coax unit is required. A few examples of its use are coax unit provisioning, remote line card debug and remote unit craft access.

The Message Waiting Link (MWL) is transmitted only in the downstream direction and contains information regarding the Unit ID of remote units that have a message waiting. This channel is checked during the wake-up cycle for a remote unit that has gone into a power-saving sleep mode, and the unit will remain awake when it's ID is listed on the MWL. The modulation level is 16 QAM and 3 tones are used. The frequency of the MWL is fixed and is next to the MAL.

The control/signaling facilities in the upstream direction include an Upstream Contention Operations Link (UCOL); an Upstream Reservation Operations Link (UROL); an Upstream Modem Operations Channel (UROC); and an Upstream Media Data Link (UMDL).

The Upstream Contention Operations Link (UCOL) is transmitted in the upstream direction only and is used for contention based SRQ (Service Request) communication between the CTU controllers 56 and the TCPs 212 and 214. A single message has 24 bits data (12 bit ID, 4 bit SRQ type, and 8 bit facility ID) and 16 bits CRC to insure that collisions are easily detected. A message is transmitted over 7 frames using 8 tones (plus a one tone guard band). Of the 56 symbols transmitted in this interval, 40 contain one bit of data (QPSK equivalent) and 16 are reference symbols that are required to perform a burst mode equalizer training. The frequency location of the UCOL is flexible and the start tone of the channel is given in the MAL. Data to be transmitted over the UCOL is input to the modem via an SRQ command.

The Upstream Reservation Operations Link (UROL) is transmitted in the upstream direction only. Only one UROL channel can be designated and there is no possibility of collision. In an embodiment, 5 tones are used for this channel with 16 QAM modulation resulting in 10 bits transmitted per frame (64 kb/s information, 8 kb/s signaling, 8 kb/s parity). The modulation/demodulation is similar to the burst mode technique for the contention based channel to avoid the delay associated with a full blown equalizer training. The frequency location of the UROL is flexible and the start tone of the channel is given in the MAL. The UROL byte is the first byte in the payload data stream and a command is required to instruct the modem to transmit this data. The modem does not interpret the data at all.

The Upstream Modem Operations Channel (UMOC) is transmitted in the upstream direction only and is used for internal modem to modem communications. This is a reservation based channel in response to messages in the DMOC and is transparent to the CTU Controller 56 (FIG. 2) and the TCP's (FIG. 3). It is used for internal acknowledgments and transporting PM related data upstream to the head-end. The frequency location of the UMOC is flexible and the start tone of the channel is given in the MAL. A single message has 48 bits and is transmitted over 7 frames using 6 tones (plus a one tone guard band). Of the 42 symbols transmitted in this interval, 24 contain 2 bits of data (16 QAM equivalent) and 18 are reference symbols that are required to perform a burst mode equalizer training.

The Upstream Media Data Link (UMDL) is transmitted in the upstream direction only. In an embodiment, 5 tones are used for this channel with 16 QAM modulation resulting in 10 bits transmitted per frame (64 kb/s information, 8 kb/s signaling, 8 kb/s parity). Because only one subscriber can access this channel at a given time, the data is transmitted on a continuous basis after the channel is established. A TX_DMDL_EN (enable) command instructs the headend modem to set up the DMDL channel with a specific subscriber in a manner similar to a payload DS0 setup (i.e. via the DMOC). A TX_DMDL_DA (disable) command instructs the headend to disable transmission of the DMDL channel and the corresponding UMDL channel (via the DMOC). Only the specified subscriber modem will modulate this channel and the modem does not interpret the data at all. The frequency location of the DMDL is flexible and the start tone of the channel is given in the MAL. The DMDL byte is the second byte in the payload data stream.

(For completeness, note that DS0's carrying calls each use 5 tones upstream and 5 downstream using 32 QAM each.)

For control and signaling messages generally, the TCP communicates with a microprocessor in one of the CLUH's at the head end, which communicates in turn with the modem in the CLUH, which communicates with the modem in one of the CTU's via one or more of the control/signaling facilities described above, which communicates in turn with a microprocessor in the CTU controller 56. Not all messages need to pass through all of these units. For example, modem-to-modem communications on the Upstream and Downstream Modem Operations Channels are never seen by the microprocessors on either the CLUH or the CTU. In the descriptions that follow, it will be helpful to have the following list of messages that can be transmitted between or among the various units. The following codes are used in this table:

(I) Input command from controller on CLUH or CTU to local modem (O) Output result from modem on CLUH or CTU to local controller (H) Command valid for CLUH (R) Command valid for CLUR (T) Command valid for CTU.

| | |
|---|---|
| **RF TUNING COMMANDS** | |
| SET_RX_FREQ | Set receiver tuner to a specific frequency band (I : H,R,T) |
| SET_TX_FREQ | Set transmitter tuner to a specific frequency band (I: H,R,T) |
| TX_FREQ_REQ | Request current TX frequency value (I : H,R,T) |
| TX_FREQ_RSLT | Current TX frequency value (0 : H,R,T) |
| RX_UREQ_REQ | Request current RX frequency value (I: H,R,T) |
| RX_FREQ_RSLT | Current RX frequency value (0: H, R, T) |
| RF_LOCK_ACQ | Downstream Rx has acquired RIP phase lock on the assigned frequency (0 : R,T) |
| RF_FREQ_PLAN | Sets the frequency plan to either HRC or IRC (I : HAT) |
| **PROVISIONING** | |
| UNIT_ID | 12 bit ID of remote unit (I : RT) (headend CLUH does not have a unit ID) |
| RM_UNIT_ASNG | Assign 12 bit ID of remote unit (CLUR, CTU) provisioned and assigned to CLUH (I: H) |
| RM_UNIT_DSNG | Deassign 12 bit ID of remote unit (CLUR, CTU) provisioned and assigned to CLUH (I: H) |
| RECEPT_EN | Downstream Rx has achieved RF phase lock and can successfully demodulate control channels (0 : R,T) |
| MWL_UNIT_ASNG | Assign a CTU UNIT ID, to the message waiting link (I: H) |
| MWL_UNIT_DSNG | Remove a CTU Unit ID from the message waiting link (I: H) |
| MWL_UNIT_ON | Informs a CTU that it has a message pending at the CLUH (0 : T) |
| _CluhProvMsg_ | CLUH provisioning message |
| _Ctu2ProvMsg_ | CTU-2 provisioning message |
| **RANGING COMMANDS** These commands are used to range residential subscriber modems | |
| RANGE_EN | Enable ranging transmission (I : R, T) |
| RANGE_COMP | Ranging measurement complete (0 : R,T) |
| RANGE_COL | Ranging collision (0 : R,T) |
| RANGE_DA | Disable ranging transmission (I : R, T) |
| **DS0 COMMANDS** | |
| PAYLD_EN | Assign subchannels and train equalizers for transmission and reception for a specified DS0 and remote ID (I: H) |
| PAYLD_DA | Disable data transmission and reception for specified DS0 and remote ID and deallocate payload subchannels (I: H,0 : H,R,T) |
| PAYLD_EST | Subchannels have been successfully assigned and trained for DS0 transmission (0 : H,R,T) |
| PAYLD_FAIL | Subchannel assignment and training DS0 transmission has been attempted .3 times and failed each time (0 : H,R,T) |
| DMDL_EN | Assign subchannels and train equalizers for DMDL transmission with a specified remote ID (subscriber) (I: H) |
| DMDL_DA | Disable data transmission for the DMDL with a specified remote ID (I: H, 0 : H,R,T) |
| DMDL_EST | Subchannels have been successfully assigned and trained for DMDL transmission (0 : H,R,T) |

-continued

| | |
|---|---|
| DMDL_FAIL | Subchannel assignment and training for DMDL transmission has been attempted 3 times and failed each time (0: HAT) |
| TRAIN_DMOC | Send reference symbols over DMOC on next superframe to provide quick training of this control channel after RF tuning (I : H) |
| TX_UROL | Transmit' data packet on the Upstream Reservation Operations Link (I: R,T) |
| RX_UROL | Start monitoring for an upstream message (I : H) |
| DA_UROL | Stop transmitting data packet on the Upstream Reservation Operations Link (I: H,R,T) |
| _TimeSlotAssignMsg_ | Assign time slots on the coax |
| _TimeSlotAssignReplyMsg_ | Reply to assignment of time slots on the coax |
| _TimeSlotDeassignMsg_ | Deassign time slots on the coax |
| _TimeSlotDeassignReplyMsg_ | Reply to deassignment of time slots on the coax |
| **PERFORMANCE MONITORING AND PROTECTION SWITCHING** | |
| SNR_REQ | Request current average SNR measurement (I : H) |
| SNR_RSLT | Result from current average SNR measurement (0: H) |
| SET_SNR_THRS | Set threshold value for average SNR (I : H) |
| ERR_DS0_REQ | Request the current total number of errored DS0s measurement (I : H) |
| ERR_DS0_RSLT | Result from current total number of errored DS0s measurement (0 : H) |
| PAR_ERR_REQ | Request the current total number of parity errors measurement (I : H) |
| PAR_ERR_RSLT | Result from current total number of parity errors measurement (0 : H) |
| UN_DS0_REQ | Request current total number of unavailable DS0S measurement |
| UN_DS0_RSLT | Result from current total number of unavailable DS0s (0: H) |
| SET_UNDS0_THRS | Set threshold value for total number of unavailable DS0s |
| START_INT | Begin data gathering for all PM parameters for a new interval (15 min, hourly or daily) |
| PM_PROG | PM is in progress. The CTU must stay awake (0 : T) |
| PM_COMP | PM is complete. The CTU can go to sleep if applicable (0 : T) |
| _ProtectionSwitchMsg_ | Protection switch message |
| _ProtectionSwitchTcaMsg_ | Protection switch Threshold Crossing Alert message |
| _RemoteUnitAssignMsg_ | Used at the CLUH to assign CTU's to CLUH's |
| _RemoteUnitAssignReplyMsg_ | Used at the CLUH to acknowledge assignment of CTU's |
| _RemoteUnitDeassignMsg_ | Used at the CLUH to deassign CTU's from CLUH's |
| _RemoteUnitDeassignReplyMsg_ | Used at the CLUH to acknowledge deassignment of CTU's |
| _ClnkPmRetrievalMsg_ | Retrieve performance monitoring data at the CLUH |
| _ClnkRetrievalReplyMsg_ | Reply to Retrieval message |
| _ClnkPmInitRegsMsg_ | Initialize performance monitoring registers at the CLUH |
| _ClnkPmInitRegsReplyMsg_ | Reply to Initialization message |

-continued

| AUTONOMOUS EVENTS | |
|---|---|
| APS_TCA | Automatic protection Switch Threshold Crossing Alert (0 : H,R,T) |
| PM_TCA | Performance Monitoring Threshold Crossing Alert (0 : H) |
| FLT_ACTIVE | Fault detected (0 : H,R,T) |
| FLT_CLEAR | Fault cleared (0 : HAT) |
| MISCELLANEOUS COMMANDS | |
| SRQ_MESSAGE | SRQ message that is transmitted/received via the UCOL (0: H, I: R,T) |
| MACK | SRQ transmission successfully received at CLUH (0: RX |
| ERROR | Error in execution of latest command (0 HAT) |
| IDLE_PAYLOAD | Set idle pattern for payload DS0 data (I : H,R,T) |
| RESET_MICRO | Downstream Rx has received a message from the headend to reset the remote micro controller, CLGA and modem (I:H,O : R,T) |
| RESET_MODEM | Modem reset (I: H,R,T) |
| TX SINUSOID | Transmit sinusoid-like signal on specified subchannel (I: H,R,T) |
| T0_STATUS | Message indicating the On-Hook or Off-Status of a CTU2 TO (I: H) |
| NOP | No Operation (I: H,R,T) |
| __CxEncapsMsg__ | Used to encapsulate all Coax-specific messages |
| __CnuCraftMsg__ | Used from CNU craft access |
| __CnuCraftReplyMsg__ | Used from CNU craft access |

Figure 4:
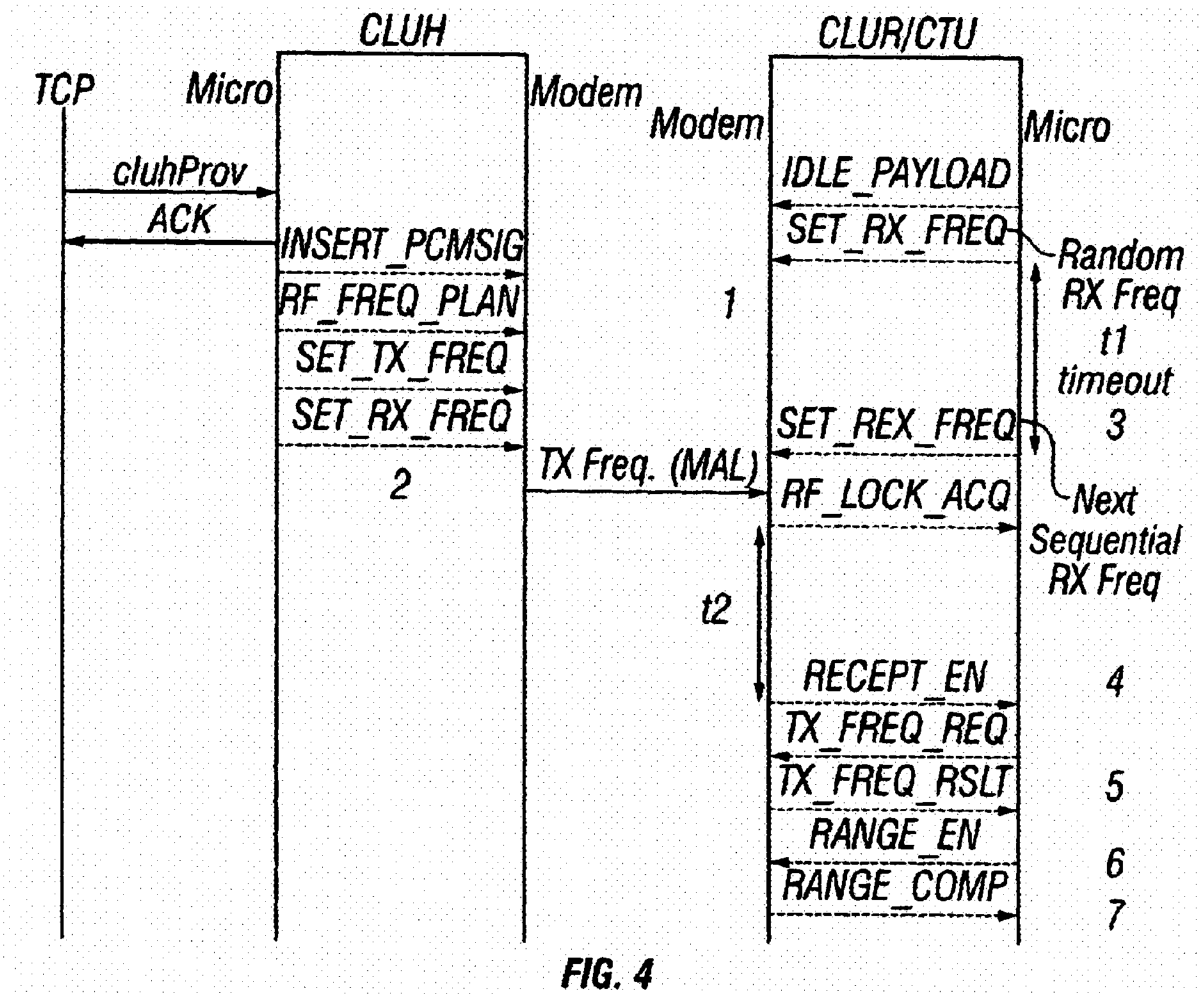
FIG. 4 is a ladder diagram illustrating the sequence of messages that take place upon CLUH and remote unit startup.

FIG. 4 is a ladder diagram illustrating the sequence of messages that take place upon CLUH and remote unit startup. At the head-end, a CLUH is provisioned by the TCP with a downstream frequency plan, downstream channel and upstream channel, all using the cluhProv message. The Micro in the CLUH acknowledges the provisioning message. The CLUH sends an INSERT_PCMSIG message to its micro, to cause signaling and PCM codes to be inserted by the CLUH Modem towards the CLUH micro, when the modem determines that a specific Payload DS0 is in a failure state and there is a payload established. At the remote unit (e.g. a CTU), the remote unit micro sends an IDLE_PAYLOAD command to its modem to cause the modem to insert an idle code toward the remote unit micro in each payload DS0 for which there is no payload established.

The remote unit attempts to lock on to one of 350 downstream channels that can be transmitted by a CLUH. The SET_RX_FREQ command informs the remote modem which frequency to use to tune its receiver. This initial frequency (channel) is randomly chosen by the remote unit's Micro. The frequency plan is chosen by the Modem. There are three frequency plans (STD, HRC & IRC) with 175 channel allocated for each plan. However, two of the plans are so similar that there is no technical reason for treating them differently. Hence the reason for 350 channels.

At the head-end, the CLUH is provisioned by the TCP with a downstream frequency plan, downstream channel and upstream channel. The Modem at the CLUH tunes its receiver to the provisioned receive (RX) frequency (upstream channel) and encodes the RX frequency in the MAL and transmits this information towards the remote unit over the MAL using the provisioned transmit (TX) frequency (downstream channel). As used in this description, the RX frequency at the CLUH is the TX frequency at the remote unit.

If the remote Micro does not receive a RF_LOCK_ACQ (RF lock acquired) response from the Modem within time t1, the next sequential RX frequency (downstream channel) will be chosen by the Micro and used to command the Modem to tune its receiver to the specified channel.

When a RECEPT_EN response is received from the Modem, then reception is enabled, RF phase lock has been achieved on the RX frequency (downstream channel), and the Modem can successfully demodulate control channels (that includes the MAL).

If the remote unit Micro does not receive a RECEPT-EN response from the Modem within time t1, the next sequential RX frequency (downstream channel) will be chosen by the Micro and used to command the Modem to tune its receiver to the specified channel.

The remote Micro then commands the Modem to send the TX frequency (upstream channel encoded in the MAL) using a TX_FREQ_REQ message. The Modem automatically tunes its transmitter to the TX frequency.

Next, the remote unit Micro commands the Modem to start the ranging process (RANGE_EN) if the ranging tones are available. If a ranging collision (RANGE_COL) is detected, then the micro uses a binary exponential backoff algorithm until ranging is successful, at which time the Modem informs the Micro that the ranging process is complete (RANGE_COMP). At this point, the Micro can start sending messages upstream to the TCP.

Figure 5:
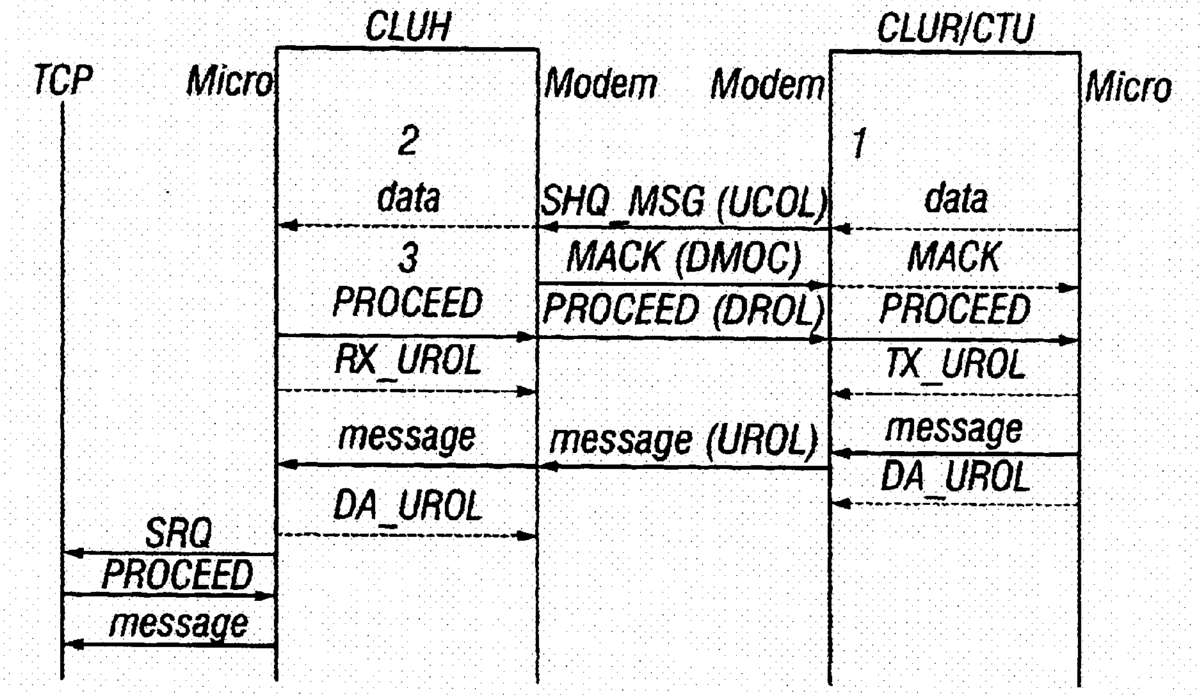
FIG. 5 is a ladder diagram illustrating how a remote unit can initiate a message in the upstream direction.

FIG. 5 is a ladder diagram illustrating how a remote unit can initiate a message in the upstream direction. Referring to FIG. 5, the process begins with the remote unit micro sending a SRQ_MSG (data) command to the remote Modem. SRQ types are as follows:

a. On-Hook b. Off-Hook c. Craft Command d. Protection Switch e. Train Equalizer f. Message Waiting Request g. Data The remote modem forwards the message via the UCOL to the CLUH modem. Neither modem needs to know the content of the message transmitted on the UCOL.

If the SRQ_MSG is received at the CLUH head-end Modem without a collision and without a CRC error, then the head-end Modem sends a MACK response downstream and also passes the SRQ_MSG to the CLUH Micro. (If no MACK is received by the downstream micro within a timeout period, then a binary exponential backoff algorithm is used until a MACK is received or transmission is aborted.)

If the UROL is not being used, then the CLUH Micro sends a PROCEED downstream on the DROL. Note that a PROCEED is sent based on the type of SRQ_MSG. In the case of a data SRQ_MSG, the message that the remote unit wants to send is longer than can be accommodated in a SRQ_MSG. The Micro informs the Modem to start monitoring for an upstream message. The response to a PROCEED message is either a normal upstream message or a NAK. The Modem does not need to know what the content is of the message transmitted on the DROL.

After receiving the PROCEED at the CLUR/CTU, the Micro transmits the message upstream over the UROL. Note the TX_UROL command informs the Modem when to transmit and the DA_UROL informs the Modem when to stop transmission. The Modem does not need to know what the content is of the message transmitted on the UROL.

The upstream message is passed on to the CLUH Micro. The Micro informs the CLUH Modem to stop demodulating the UROL tones (DA_UROL) whereby it can start monitoring for the next UROL message. Next, the Micro NAKs the message if it is received with errors; otherwise, the Micro sends a SRQ to the TCP and waits for the PROCEED.

When a coax remote unit is powered up, after the startup procedure described above with respect to FIG. 4, it obtains a coax unit ID from the TCP. Until a unique ID is assigned, the remote unit's coax unit ID is zero. ID's are assigned at sign-on rather than being pre-programmed into the remote unit (like the serial number), because this permits centralized management and reduces the need for a craftperson to visit the remote sites.

Figure 6:
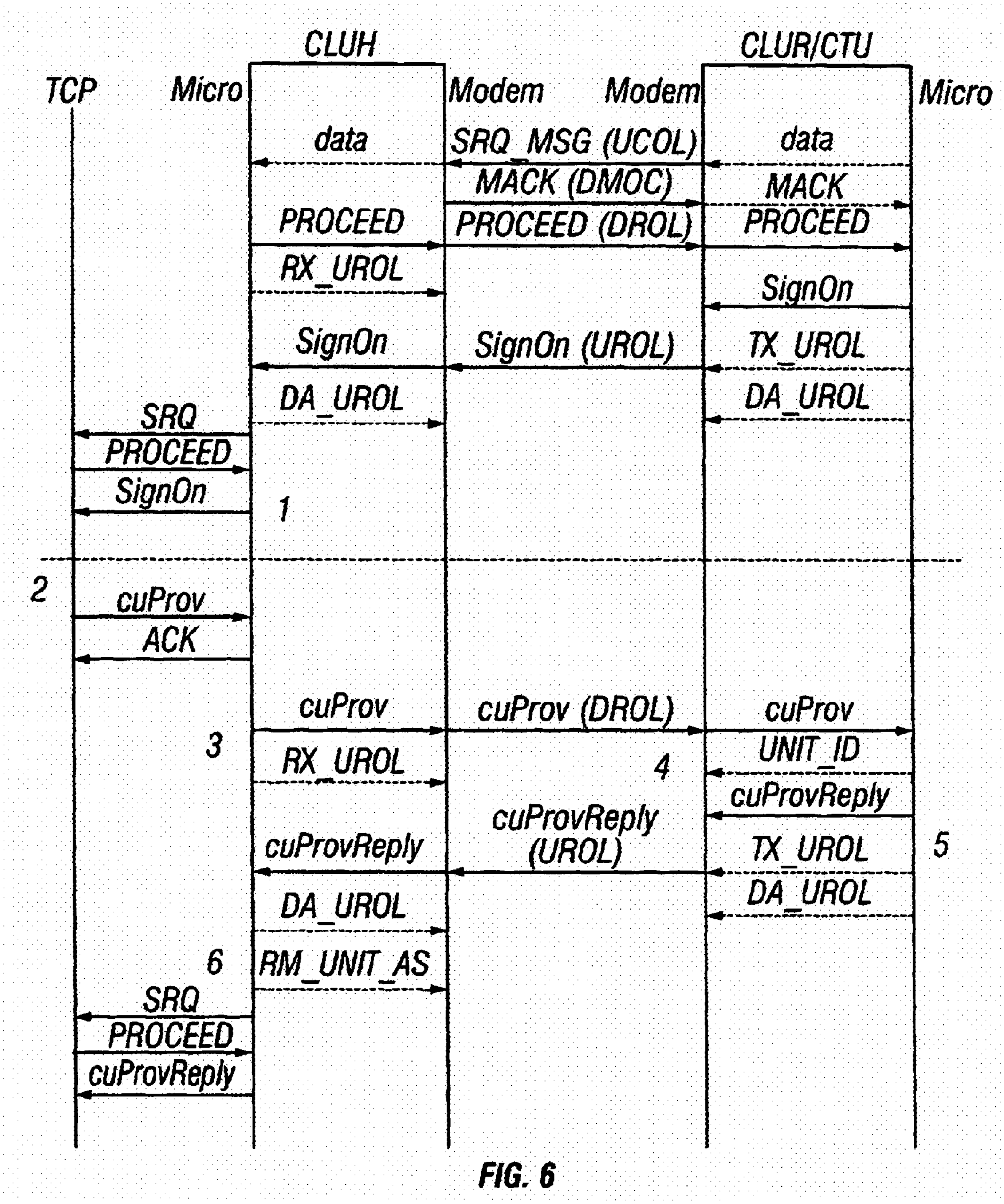
FIG. 6 is a ladder diagram illustrating a sign-on process.

FIG. 6 is a ladder diagram illustrating the sign-on process. Initially, the remote unit uses the remote-unit-initiated upstream messaging mechanism described above with respect to FIG. 5 to send a signon message to the TCP. This part of the process is shown above the dotted line in FIG. 6. After receiving the signOn message, the TCP checks its database for the hardware serial number received in the signon message. This serial number is provisioned when the coax unit equipment is entered into the database.

If there is a match, then the TCP next provisions the coax unit using a cuProv message. At a minimum, this message contains a unique coax unit ID, the coax unit hardware serial number, Primary upstream (TX) and downstream (RX) channels, a set of back-up upstream (TX) and downstream (RX) channels, frequency plan, CLUH protection switch inhibit status, and coax unit protection switch inhibit status.

The TCP always attempts to minimize concentration ratios and maximize the protection bandwidth available on CLUHs. That is, the CLUH that is currently communicating with the remote unit may not be the best fit, in which case, a new set of Primary frequencies, associated with a different CLUH, is provisioned for the remote unit.

Next, the cuProv message is broadcast over the DROL to all coax units; however, the unit ID is not the broadcast ID, it is the unique unit ID the of the remote unit being provisioned. All coax units with an ID of zero will process this message if the message is received without errors. Each coax unit will compare the serial number received in the message with the hardware serial number of the coax unit receiving the message.

If the cuProv message is received without errors, and if the serial number received in the cuProv message matches the serial number of the remote unit, then the remote unit Micro sends a UNIT_ID command to the Modem. This command contains the unique coax unit ID that was received in the cuProv message.

The remote Micro then responds back to the TCP. If the TX and RX primary frequencies in the cuProv message are different from the frequencies currently in use, then a switch is made. Upon receiving the cluProvReply message, the Micro sends a RM_UNIT_ASNG command to the CLUH Modem.

Figure 7:
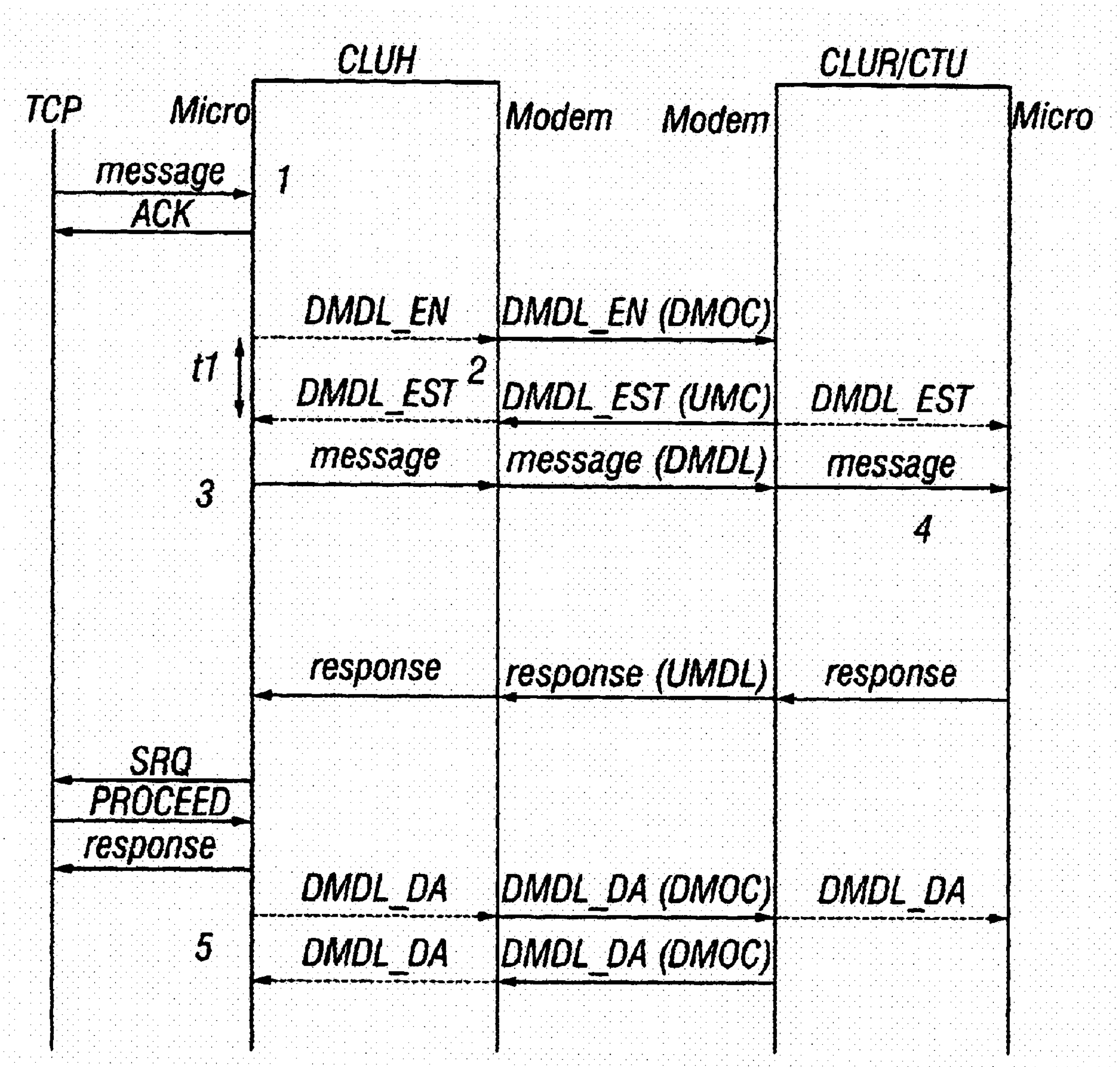
FIG. 7 is a ladder diagram illustrating downstream messaging using a downstream media data link.

The DROL is used for downstream communications prior to remote unit sign-on, because the remote unit does not have a unique address. After sign-on, downstream messages to a specific remote unit use the DMDL. The DMDL must be established before it is used. FIG. 7 is a ladder diagram illustrating downstream messaging using the DMDL.

Referring to FIG. 7, the TCP first sends a message to the CLUH Micro. The Micro determines if the MDL is available. The MDL may already be reserved. If the MDL is available, then the Micro establishes the media data link to the specified remote unit. ("MDL" refers to both the UMDL and DMDL, since both are reserved simultaneously.) If the MDL is not available, then the message is buffered in the Micro.

When the link is established, the Micro passes the message on to the CLUH Modem for transmission downstream. When this happens, the MDL is now reserved for the specified coax until a response is received.

The remote Micro then receives the message. If the message is received without errors, then it is processed and an appropriate response is returned. If the message is received with errors, then a NAK is returned. If the CLUH receives the response without errors, then the CLUH Micro disables the MDL path. Otherwise, the Micro NAKs the message.

The MDL is used for all provisioning commands.

Modem Protection Switching

CLUH Protection

In the case where there is a hardware failure of the CLUH the downstream transmission of the Modem will be terminated. When all associated coax units detect the loss of signal they will automatically switch to their Secondary Frequency; the same thing would happen on a CLUH card pull. The TCP will be informed of a card failure or out of slot condition and re-provision the time-slot-interchange (TSI) mapping and the protection CLUH(s) to remap bandwidth to the backplane bus(es) on that CLUH.

A bottleneck on the new CLUH would be the time for the CTUs which have active calls to equalize with the new headend as only 3 coax units can equalize at a time. In order that the re-establishment of call can occur at a faster pace coax units are provisioned with Secondary Frequencies which are distributed over the Headend Modems with available bandwidth. This enables the coax units to re-equalize in parallel.

Note that in the case where there is a catastrophic failure of a frequency there is no advantage in re-tuning that individual Headend Modem since the coax units still would be required to equalize again on the tones that they are using. This process would produce a bottleneck as this would occur serially.

Coax Unit Protection

A single Cable Group can have up to 1920 Coax Units (remote units) assigned. The Coax Units represent a pool of equipment that can be assigned to any of the available Modems in the Cable Group. There are two levels of protection supported:

Intra-Modem protection: The head-end Modem moves Active DS0s from errored tones to spare tones available on the same Modem.

Inter-Modem protection: The TCP moves Coax Units from one CLUH to another or the Coax Units detect a catastrophic failure of the Modem downstream frequency and move autonomously.

Bandwidth (i.e. calls) may be dropped if there is not enough spare bandwidth available. Intra-Modem is the first level of protection as this is the least disruptive to the call and will occur transparently to the micros at both ends of the coax. Inter-Modem protection occurs as an attempt to prevent a catastrophic failure of the call. In the normal course of events the number of remote units assigned to a Modem (CLUH) is managed by the TCP so that there should be sufficient spare bandwidth on a Modem to allow Intra-Modem protection to handle any failures. The following leveling rules apply to the allocation of Coax Units to Modems:

1. number of DS0s available for protection on any given CLUH is maximized.
2. The level of concentration on any given CLUH is minimized.

3. The number of coax units communicating with any one CLUH is minimized and will not exceed 128.

The above criteria are followed not only during protection switching scenarios, but also during the sign-on of a new remote unit.

Intra-Modem Protection

Intra-Modem protection describes the function of the Modem which is constantly monitoring the tones for signal to noise and parity errors and moving active calls from one set of tones to another to preserve the desired Bit Error Rate (BER). At some point there may come a time when the tones transporting the DS0 data and signaling drops below the threshold where the tones are considered bad and there are no more tones available on that Modem for protection. The TCP is informed that the call has passed a threshold where it should be protection switched to another Modem with available bandwidth (Inter-Modem protection). If protection switching can not be performed, then an error rate of 10–3, equivalent to a signal to noise of 10 db, for 2.5 seconds will cause the DS0 to be dropped and conditioning upstream and downstream to be applied.

Inter-Modem Protection

Inter-Modem protection is required when a call is active and the tones which support it become errored beyond the protection threshold and there are no spare tones of sufficient quality available to move the call internally. Additionally, Inter-Modem protection is required when a Modem has either a hardware failure, card removal or catastrophic failure of its downstream and/or upstream frequencies.

CLUH-initiated Inter-modem Protection Switch Event

Figure 8:
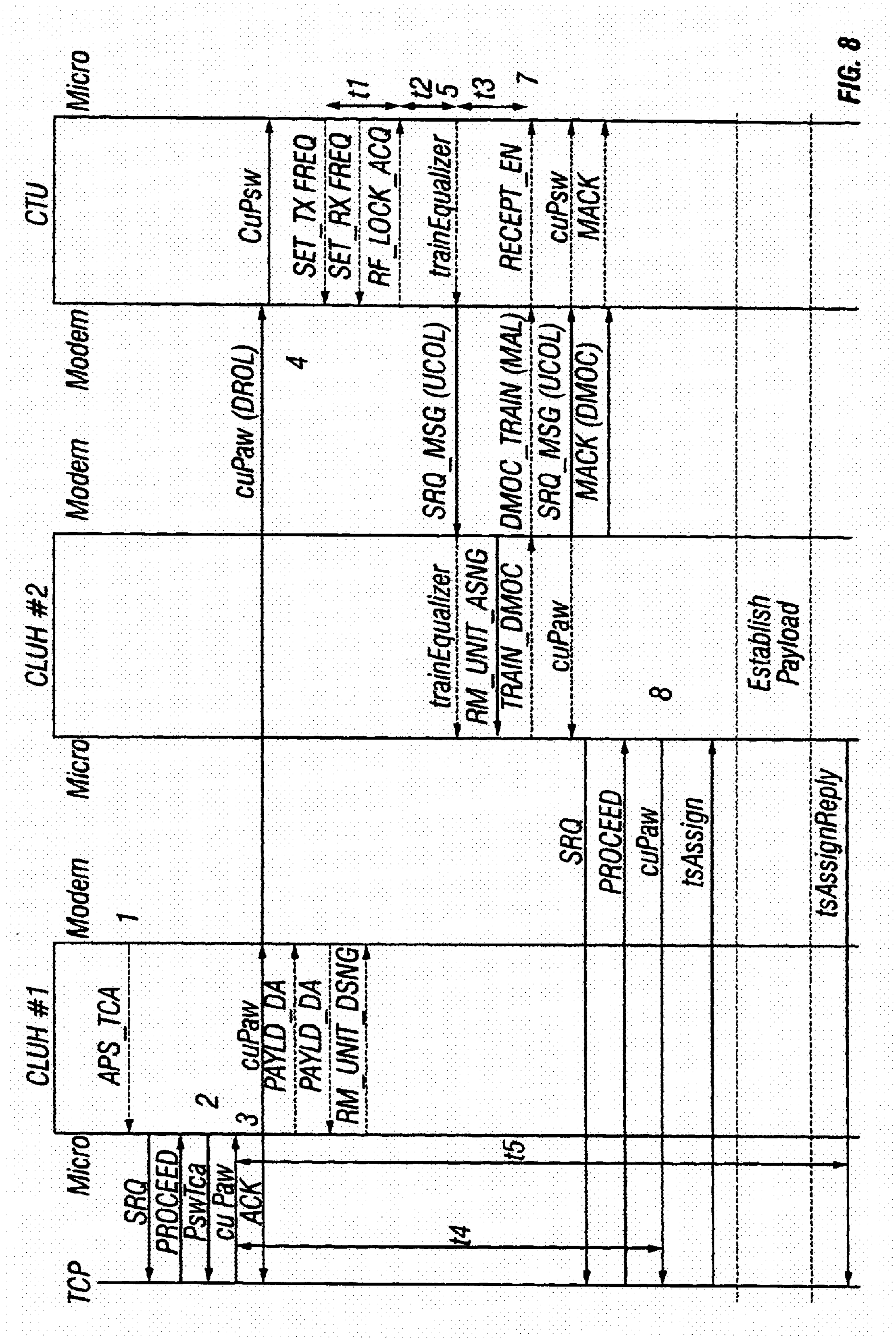
FIG. 8 is a ladder diagram illustrating a CLUH-initiated inter-modem protection switch event.

FIG. 8 is a ladder diagram illustrating a CLUH-initiated inter-modem protection switch event. In this diagram, t1 is the time the remote Modem takes to retune to new frequencies so that the upstream communications channels are available to it and to achieve multiframe synchronization. That includes time for retuning and time for achieving multiframe synchronization. t2 represents time to train and decode the MAL. t3 represents the time the Modem takes to train the equalizer taps for downstream communication channels, and t4 is a time delay to allow the coax unit to retune and re-synchronize before a tsAssign message is sent. Some overhead is included.

The following general protection switching rules apply:

a. A CLUH is considered the master and the remote unit is a slave.

b. The TCP always attempts to minimize concentration ratios and maximize the protection bandwidth available on all CLUHs and selects a best fit.

c. When the remote unit receives a cuPsw message it compares the upstream and downstream channel information received in the message with the channels currently in use. If the channels currently in use are different from the channels received in the cuPsw message, then the coax unit switches using the channels received in the cuPsw message.

d. If a cuProv message is received with primary channel information different from what is currently in use, then the a protection switch is initiated.

e. There may or may not be DS0 payloads assigned. In the case where there are payloads assigned, the coax unit returns a cuPswStatus message to the TCP after the payloads are re-established.

f. Coax units with payloads established take priority over coax units that do not. However, payloads established for PM purposes do not have this priority. There are other levels of priority.

Referring to FIG. 8, first CLUH #1 detects a APS_TCA, but there is no bandwidth available for Intra-Modem protection switching. CLUH #1 sends high priority SRQ to TCP. Note that this example depicts a protection switch of one DS0 associated with a CTU2. That is, remote units may also have more than one DS0 payload established. Therefore, more than one DS0 will have to be moved if the remote unit is to be moved to another CLUH. The TCP keeps track of the available bandwidth on each CLUH in order to make the search for the most suitable replacement CLUH as efficient as possible.

Note in the present embodiment, all channels of a given CTU communicate with the same head-end equipment (i.e. a single CLUH), and do so within the single 2 MHz upstream and the single 2 MHz downstream frequency bands controlled by that CLUH. In another embodiment, different channels of a single CTU could communicate with more than one unit of head-end equipment, and/or using more than one upstream or more than one downstream frequency band. Furthermore, whereas in the present embodiment all channels assigned to a given CTU are moved together during an inter-modem protection switching event, another embodiment could permit only the errored channel or channels assigned to the CTU to be moved, leaving other channels of assumedly acceptable quality unmoved. As used herein, a channel of "assumedly acceptable quality" includes all channels tested for sufficient quality, as well as any that have not been tested at all yet or have not been tested negatively.

Also, note that an APS_TCA is not the only catalyst used to initiate a protection switch. The following CLUH detected events initiate a protection switch:

a. CLUH Hardware Failures b. Automatic Protection Switch Threshold Crossing Alert c. Craft Initiated Switch Returning to FIG. 8, after APS_TCA, CLUH #1 receives a PROCEED message from TCP and sends a pswTca message to the TCP. The TCP then sends a cuPsw message to CLUH #1 if protection switching is not inhibited at the CLUH nor coax unit. CLUH #1 sends the message to the remote unit. The Micro on CLUH #1 commands the Modem to disable any associated payload and then deassigns the remote unit ID of the CLUR/CTU being switched from CLUH #1. The cuPsw message contains the primary RX and TX frequencies that the coax unit will switch to after receiving the message.

The TCP attempts to minimize concentration ratios and maximize the protection bandwidth available on CLUHs. In this scenario, the TCP determines that CLUH #2 is the best fit. PM concentration registers (CONCR) and the protection switch attempts (PSWA) registers are updated accordingly. If the concentration thresholds are exceeded due to reassignment of coax units, then the TCP reports a threshold alert.

When the remote unit Micro receives the cuPsw message, the Micro commands the remote unit Modem to tune to the new RX and TX frequencies. The remote unit Micro will signal freeze from the point of beginning retune to the re-establishment of bandwidth on the Modem for DS0 transport.

The remote unit Modem informs the remote unit Micro when tuning is complete and multiframe synchronization is achieved (RF_LOCK_ACQ). The Micro then sends CLUH #2 a message to command the head-end Modem to train the equalizer taps downstream. The Micro must delay t2 before sending the message. Note that there is no MACK response since the DMOC is not trained at this time.

When the CLUH #2 Micro receives the trainEqualizer message, the Micro sends the head-end Modem a RM_UNIT_ASNG command, and then commands the Modem to train the equalizer taps downstream. An indication is received by the remote Micro when the training is complete (RECEPT_EN) and then the Micro send a cuPsw message to CLUH #2. CLUH #2 then receives the cuPsw message and sends it to the TCP. If a cuPsw message is not received within t6 of sending the cuPsw message, then the TCP updates the PM protection switch failure (PSWF) registers accordingly.

If there is a payload involved, then the TCP next sends a tsAssign message to CLUH #2 to re-establish the payload. Note that depending on the scenario, there may not always be a DS0 payload established. If that is the case, coax units with payloads assigned take priority over those that do not.

Coax Unit Initiated Protection Switch Event

Figure 9:
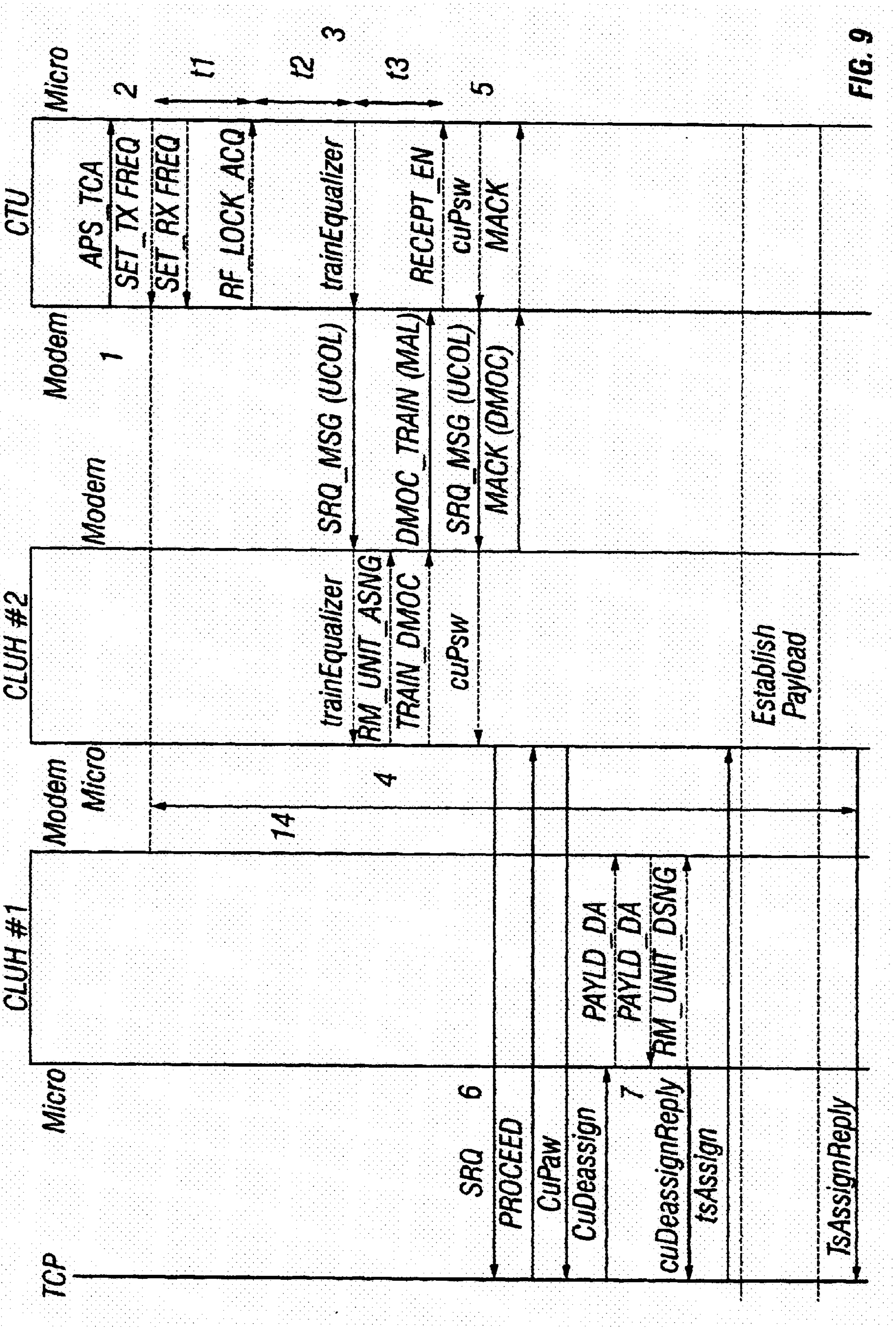
FIG. 9 is a ladder diagram illustrating a remote-unit-initiated inter-modem protection switch event.

FIG. 9 is a ladder diagram illustrating a remote-unit-initiated inter-modem protection switch event. In this diagram, t1 is the time the remote Modem takes to retune to new frequencies so that the upstream communications channels are available to it and to achieve multiframe synchronization. t2 is the time to train and decade the MAL. t3 is the time the Modem takes to train the equalizer taps for downstream communication channels. The general protection switching rules described above with respect to CLUH-initiated inter-modem protection switch events apply here as well.

Referring to FIG. 9, the remote unit Modem first detects a APS_TCA, but there is no bandwidth available for Intra-Modem. protection switching. The Micro on the remote unit is informed. Note that this example depicts a protection switch of one DS0 associated with a CTU. That is, a CTU may also have more than one DS0 payload established. Therefore, more than one DS0 will have to be moved in the present embodiment if the CTU is to. be moved to another CLUH. The TCP keeps track of the available bandwidth on each CLUH in order to make the search for the most suitable replacement CLUH as efficient as possible. The comments made above with respect to CLUH-initiated protection switch events, regarding the ability of other embodiments to move one DS0 of a CTU without moving other DS0's associated with the same CTU, apply to coax-unit initiated protection switch events as well.

Note also that a APS_TCA is not the only catalyst used to initiate a protection switch. The following remote unit detected events initiate a protection switch:

a. No messages received for approximately 4 minutes b. Automatic Protection Switch Threshold Crossing Alert c. Craft Initiated Switch After the remote unit micro receives APS_TCA, the Micro sends the a randomly selected, provisioned secondary RX and TX frequency set to the Modem if protection switching is not inhibited at the CLUH nor coax unit. The Micro will signal freeze from the point of beginning retune to the re-establishment of bandwidth on the Modem for DS0 transport.

The remote unit Modem informs the Micro when tuning is complete and multiframe synchronization is achieved (RF_LOCK_ACQ). The Micro then sends CLUH #2 a message to command the head-end Modem to train the equalizer taps downstream. The Micro must delay t2 before sending the message. There is no MACK response since the DMOC is not trained at this time.

When the CLUH #2 Micro receives the trainEqualizer message, the Micro in the CLUH #2 sends the CLUH Modem a RM_UNIT_ASNG command, and then commands the head-end Modem to train the equalizer taps downstream.

An indication is received by the remote unit Micro when the training is complete (RECEPT_EN), and in response thereto it sends the TCP a cuPsw message. When the TCP receives the cuPsw message, the TCP attempts to minimize concentration ratios and maximize the protection bandwidth available on CLUHs. In this scenario, the TCP determines that CLUH #2 is the best fit. PM concentration registers (CONCR) and protection switch attempts (PSWA) registers are updated accordingly. If concentration thresholds are exceeded due to reassignment of coax units, then the TCP reports a threshold alert. Alternatively, if the TCP determines that the current CLUH with which the switched remote unit is communicating is not the best fit, then the TCP sends a cuPsw message to the remote unit with a different set of primary TX and RX frequencies. The process starts over just as with a CLUH initiated protection switch.

After the TCP determines that CLUH #2 is the best fit, the TCP sends a cuDeassign message to CLUH #1. The Micro in CLUH #1 commands the Modem to disable any associated payload and then sends a RM_UNIT_DSNG message to the Modem. If there is a payload involved, then the TCP sends a tsAssign message to CLUH #2 to re-establish the payload. Depending on the scenario, there may not always be a DS0 payload established. If that is the case, coax units with payloads assigned take priority over those that do not.

Performance Monitoring

The system described herein determines the necessity for protection switching by monitoring the performance of the sub-multiplexed channels between the head-end and the remote units. Each remote unit monitors both protection switch attempts and protection switch failures. CLUHs monitor the following statistics: Signal-to-noise ratio (SNR) and Unavailable DS0s (UDS0's), among others.

Each CLUH maintains current registers and history registers for the SNR, and UDS0 monitored types. The CLUH Modem maintains the current registers for both near-end (CLUH) and far-end (remote unit) PM. The CLUH Micro maintains the history registers for both near-end and far-end PM. When a CLUH is powered up, all PM registers are cleared and thresholds are set to their defaults.

Each CLUH is responsible for establishing the beginning of PM intervals (15 minute, hourly and daily). The CLUH Micro sends the Modem a xxx_REQ command for the appropriate interval and monitored type. The Modem receives the xxx_REQ command and returns a xxx_RSLT to the Micro. The Micro stores the xxx_RSLT in the appropriate history register. The Micro then sends the Modem Controller a START_INT command to the Modem. The Modem clears the appropriate current register.

For those monitored types located on the CLUH, monitoring is the responsibility of the Modem. SNR is measured on all payload tones (active and inactive) and Embedded Operations (EOC) tones. Inactive payloads tones are those tones associated with DS0 payloads which are not assigned or established.

Monitoring is performed at both the near-end and the far-end and is done regardless of any power-saving sleep mode in the remote unit. Monitoring of inactive DS0s is preempted by call processing.

The average SNR 15 Minute PM register is updated at the end of an interval after all measurements in that interval have been made. The Daily register is updated when the 15 Minute register is updated. The measurements from one interval are distinct from any other interval.

An Unavailable DS0 (UDS0) is counted when the average SNR goes below 10 dB during an interval. During any interval this DS0 only counts as 1, regardless of how many times it goes below the threshold. The UDS0 threshold is based on a weighted average of the most recent SNR values. When this average goes below the 10 dB threshold, this DS0 is counted as unavailable for this interval. It is counted only once in each interval.

Each remote unit is activated periodically to perform the monitoring of inactive payload DS0s or to collect PM data on active payload DS0s. This periodic PM acts as an "I'm alive" indication when the DS0s and remote units are cycled through. In this case, an indication is given every 2 minutes of the active status. Each DS0 is activated for approximately one second to generate 50 SNR measurements and 8000 parity measurements.

It is the responsibility of the CLUH Modem to transmit downstream PM data which is gathered by the remote Modem and then the results are sent back to the CLUH Modem in order to update the current PM registers for the far-end. The DMOC is used to set up the active monitoring transparently to the micros at either end of the coax.

To establish thresholds for SNR and UDS0, the TCP sends a setThreshold command to the appropriate CLUH Micro and the Micro sends the Modem a SET__xxx__THRS command. When a threshold is crossed, the modem at the CLUH reports a PM__TCA (Performance Monitoring Threshold Crossing Alert) to the TCP via the CLUH Micro.

The modem declares an APS__TCA on a dynamic or semi-permanent DS0 payload and reports to the TCP when:

a. a DS0 payload is dynamic, or b. a DS0 payload is semi-permanent, "off-hook", and the payload sleep mode equals true, or c. a DS0 payload is semi-permanent and the payload sleep mode equals false, and d. the Modem detects 5 parity error events or more in a single superframe (3.75 ms) or detects 20 or more parity error events within a multi-superframe (960 ms) for the DS0 in question, and e. a suitable protection DS0 within the Modem can not be found.

The Modem declares an APS__TCA on a semi-permanent DS0 payload and reports to the TCP when:

a. the DS0 payload is "on-hook" and the payload sleep mode equals true, and b. a valid signal is not received during 80 superframes (300 ms), and c. a suitable protection DS0 within the Modem can not be found.

The Modem declares a APS__TCA on a permanent DS0 payload and reports to the TCP when:

a. the Modem detects 5 parity error events or more in a single superframe (3.75 ms) or detects 20 or more parity' error events within a multi-superframe (960 ms) for the DS0 in question, and b. a suitable protection DS0 within the Modem can not be found.

A protection switch fail event is declared and reported by the TCP when a remote unit cannot be moved to another CLUH. If there is payload associated with the remote unit and protection switching is unsuccessful, then trunk conditioning is performed on the associated payload.

The Loss of Rx Lock status signal must be on for a predetermined timeout period before the Modem outputs the active fault (FLT__Active) command. The same is true for the Loss of Tx Lock status signal. The Modem outputs a clear command (FLT__Clear) shortly after the associated failure condition has been corrected. An APS__TCA occurs before a Loss of Rx or Tx Lock.

A Digital Modem Failure (DMF) is declared and reported by the CLUH Micro when it detects that the digital section of the modem is not responding properly.

All fault/clear conditions detected by a CLUH are reported to the TCP and the TCP is responsible for integrating the fault/clear conditions and reporting alarm status's to external operations systems.

As used herein, a given signal or event is "responsive" to a predecessor signal or event if the predecessor signal or event influenced the given signal or event. If there is an intervening processing element or time period, the given event or signal can still be "responsive" to the predecessor signal or event. If the intervening processing element combines more than one signal or event, the signal output of the processing element is considered "responsive" to each of the signal or event inputs. If the given signal or event is the same as the predecessor signal or event, this is merely a degenerate case in which the given signal or event is still considered to be "responsive" to the predecessor signal or event.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, whereas the embodiment described herein carries upstream and downstream traffic in different frequency bands, it will be appreciated that in other embodiments, upstream and downstream traffic might be carried within the same frequency band. Thus as used herein, a "downstream" communication channel could, in various embodiments, also carry upstream signals, and vice-versa. As another example, whereas the system described herein carries telephony on a cable television network, it will be appreciated that the presence of video signals is not actually required. The invention applies equally to a telephony-only system. In addition, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for protection switching of a communications system, for use with head end equipment including a plurality of line units (CLUHs) each controlling a respective set of downstream communication channels carried over a communications medium, and for use further with a plurality of remote units (CTUs) each connected to said communications medium, comprising the steps of:

assigning first and second ones of said remote units to receive downstream communications from first and second respective downstream communication channels both controlled by a first one of said line units in accordance with predetermined leveling rules;

re-assigning said first remote unit to receive downstream communications from a third one of said downstream communication channels controlled by a second one of said line units in response to detection of a predefined level of quality reduction in said first downstream channel without, in response to said detection of a predefined level of quality reduction in said first downstream channel, re-assigning said second remote unit to receive downstream communications from any of the downstream communication channels controlled by said second line unit;

wherein said step of assigning downstream communication channels to all of said remote units in accordance with predetermined leveling rules comprises the step of assigning downstream communication channels to said remote units in such a manner as to leave as equal as possible, the number of unassigned downstream channels of assumedly acceptable quality controlled by each of said line units.

2. A method for protection switching of a communications system, for use with head end equipment including a plurality of line units (CLUHs) each controlling a respective set of downstream communication channels carried over a communications medium, and for use further with a plurality of remote units (CTUs) each connected to said communications medium, comprising the steps of:

assigning first and second ones of said remote units to receive downstream communications from first and second respective downstream communication channels both controlled by a first one of said line units in accordance with predetermined leveling rules;

reassigning said first remote unit to receive downstream communications from a third one of said downstream communication channels controlled by a second one of said line units in response to detection of a predefined level of quality reduction in said first downstream channel without, in response to said detection of a predefined level of quality reduction in said first downstream channel, re-assigning said second remote unit to receive downstream communications from any of the downstream communication channels controlled by said second line unit;

wherein said step of assigning downstream communication channels to all of said remote units in accordance with predetermined leveling rules comprises the step of assigning downstream communication channels to said remote units in such a manner as to leave as equal as possible, the number of remote units assigned to receive downstream communications from each of said line units.

3. A method for protection switching of a communications system, for use with head end equipment including a plurality of line units (CLUHs) each controlling a respective set of downstream communication channels carried over a communications medium, and for use further with a plurality of remote units (CTUs) each connected to said communications medium, comprising the steps of:

assigning first and second ones of said remote units to receive downstream communications from first and second respective downstream communication channels both controlled by a first one of said line units in accordance with predetermined leveling rules;

re-assigning said first remote unit to receive downstream communications from a third one of said downstream communication channels controlled by a second one of said line units in response to detection of a predefined level of quality reduction in said first downstream channel without, in response to said detection of a predefined level of quality reduction in said first downstream channel, re-assigning said second remote unit to receive downstream communications from any of the downstream communication channels controlled by said second line unit;

wherein said step of assigning downstream communication channels to all of said remote units in accordance with predetermined leveling rules comprises the step of assigning downstream communication channels to said remote units in such a manner as to leave as equal as possible, the number of unassigned downstream channels of assumedly acceptable quality controlled by each of said line units, while also leaving as equal as possible, the number of remote units assigned to receive downstream communications from each of said line units.

4. A method for protection switching of a communications system, for use with head end equipment including a plurality of line units (CLUHs) each controlling a respective set of downstream communication channels carried over a communications medium, and for use further with a plurality of remote units (CTUs) each connected to said communications medium, comprising the steps of:

assigning first and second ones of said remote units to receive downstream communications from first and second respective downstream communication channels both controlled by a first one of said line units in accordance with predetermined leveling rules;

re-assigning said first remote unit to receive downstream communications from a third one of said downstream communication channels controlled by a second one of said line units in response to detection of a predefined level of quality reduction in said first downstream channel without, in response to said detection of a predefined level of quality reduction in said first downstream channel, re-assigning said second remote unit to receive downstream communications from any of the downstream communication channels controlled by said second line unit;

wherein said step of re-assigning said first remote unit to receive downstream communications from a third one of said communication channels controlled by a second one of said line units in response to detection of a predefined level of quality reduction in said first channel, comprises the step of re-assigning said first remote unit to receive downstream communications from one of said communication channels in accordance with said predetermined leveling rules, said first communication channel no longer being assumed to have acceptable quality.

5. A method for protection switching of a communications system, for use with head end equipment including a plurality of line units (CLUHs) each controlling a respective set of downstream communication channels carried over a communications medium, and for use further with a plurality of remote units (CTUs) each connected to said communications medium, comprising the steps of:

assigning first and second ones of said remote units to receive downstream communications from first and second respective downstream communication channels both controlled by a first one of said line units in accordance with predetermined leveling rules;

re-assigning said first remote unit to receive downstream communications from a third one of said downstream communication channels controlled by a second one of said line units in response to detection of a predefined level of quality reduction in said first downstream channel without, in response to said detection of a predefined level of quality reduction in said first downstream channel, re-assigning said second remote unit to receive downstream communications from any of the downstream communication channels controlled by said second line unit;

wherein said step of re-assigning said first remote unit to receive downstream communications from a third one of said communication channels controlled by a second one of said line units in response to detection of a predefined level of quality reduction in said first channel, comprises the step of re-assigning said first remote unit to receive downstream communications from one of said communication channels in accordance with predetermined leveling rules; and wherein said step of re-assigning said first remote unit to receive downstream communications from one of said communication channels in accordance with predetermined leveling rules comprises the step of re-assigning said first remote unit to receive downstream communications form one of said communication channels in such a manner as to leave as equal as possible, the number of unassigned downstream channels of assumedly acceptable quality controlled by each of said line units, said first communication channel no longer being assumed to have acceptable quality.

6. A method for protection switching of a communications system, for use with head end equipment including a plurality of line units (CLUHs) each controlling a respective set of downstream communication channels carried over a communications medium, and for use further with a plurality of remote units (CTUs) each connected to said communications medium, comprising the steps of:

assigning first and second ones of said remote units to receive downstream communications from first and second respective downstream communication channels both controlled by a first one of said line units in accordance with predetermined leveling rules;

re-assigning said first remote unit to receive downstream communications from a third one of said downstream communication channels controlled by a second one of said line units in response to detection of a predefined level of quality reduction in said first downstream channel without, in response to said detection of a predefined level of quality reduction in said first downstream channel, re-assigning said second remote unit to receive downstream communications from any of the downstream communication channels controlled by said second line unit;

wherein said step of re-assigning said first remote unit to receive downstream communications from a third one of said communication channels controlled by a second one of said line units in response to detection of a predefined level of quality reduction in said first channel, comprises the step of re-assigning said first remote unit to receive downstream communications from one of said communication channels in accordance with predetermined leveling rules; and wherein said step of re-assigning said first remote unit to receive downstream communications from one of said communication channels in accordance with predetermined leveling rules comprises the step of re-assigning said first remote unit to receive downstream communications from one of said communication channels in such a manner as to leave as equal as possible, the number of remote units assigned to receive downstream communications from each of said line units.

7. A method for protection switching of a communications system, for use with head end equipment including a plurality of line units (CLUHs) each controlling a respective set of downstream communication channels carried over a communications medium, and for use further with a plurality of remote units (CTUs) each connected to said communications medium, comprising the steps of:

assigning first and second ones of said remote units to receive downstream communications from first and second respective downstream communication channels both controlled by a first one of said line units in accordance with predetermined leveling rules;

re-assigning said first remote unit to receive downstream communications from a third one of said downstream communication channels controlled by a second one of said line units in response to detection of a redefined level of quality reduction in said first downstream channel without, in response to said detection of a predefined level of quality reduction in said first downstream channel, re-assigning said second remote unit to receive downstream communications from any of the downstream communication channels controlled by said second line unit;

wherein said step of re-assigning said first remote unit to receive downstream communications from a third one of said communication channels controlled by a second one of said line units in response to detection of a predefined level of quality reduction in said first channel, comprises the step of reassigning said first remote unit to receive downstream communications from one of said communication channels in accordance with predetermined leveling rules; and wherein said step of re-assigning said first remote unit to receive downstream communications from one of said communication channels in accordance with predetermined leveling rules comprises the step of re-assigning said first remote unit to receive downstream communications from one of said communication channels in such a manner as to leave as equal as possible, the number of unassigned downstream channels of assumedly acceptable quality controlled by each of said line units, while also leaving as equal as possible, the number of remote units assigned to receive downstream communications from each of said line units.

8. A method for protection switching of a communications system, for use with head end equipment including a plurality of line units (CLUHs) each controlling a respective set of downstream communication channels carried over a communications medium, and for use further with a plurality of remote units (CTUs) each connected to said communications medium, comprising the steps of assigning first and second ones of said remote units to receive downstream communications from first and second respective downstream communication channels both controlled by a first one of said line units in accordance with predetermined leveling rules;

re-assigning said first remote unit to receive downstream communications from a third one of said downstream communication channels controlled by a second one of said line units in response to detection of a predefined level of quality reduction in said first downstream channel without, in response to said detection of a predefined level of quality reduction in said first downstream channel, re-assigning said second remote unit to receive downstream communications from any of the downstream communication channels controlled by said second line unit;

wherein each of said line units further controls a respective set of upstream communication channels, further comprising the steps of:

assigning said first and second remote units to transmit upstream communications on first and second respective upstream communication channels both controlled by said first line unit:

reassigning said first remote unit to transmit upstream communications on a third one of said upstream communication channels controlled y said second line unit in response to detection of a predefined level of quality reduction in said first upstream channel without, in response to said detection of a predefined level of quality reduction in said first upstream channel, re-assigning said second remote unit to transmit upstream communications on any of the upstream communication channels controlled by said second line unit; and further comprising the step of re-assigning said first remote unit further to receive downstream communications from said third downstream communication channel in response to sad detection of a predefined level of quality reduction in said first upstream channel.

9. A method for protection switching of a communications system, for use with head end equipment including a plurality of line units (CLUHs) each controlling a respective set of upstream communication channels carried over a communications medium, and for use further with a plurality of remote units (CTUs) each connected to said communications medium, comprising the steps of:

assigning first and second ones of said remote units to transmit upstream communications on first and second respective upstream communication channels both controlled by a first one of said line units;

re-assigning said first remote unit to transmit upstream communications on a third one of said upstream communication channels controlled by a second one of said line units in response to detection of a predefined level of quality reduction in said first upstream channel without, in response to said detection of a predefined level of quality reduction in said first upstream channel, re-assigning said second remote unit to transmit upstream communications on any of the upstream communication channels controlled by said second line unit;

wherein said communications medium is anrf communications medium, wherein each of said line units are assigned a respective frequency band for upstream communications, all of the upstream communication channels in the set of upstream communication channels controlled by each given one of said line units being carried within the upstream frequency band assigned to the given line unit, wherein said step of assigning a first remote unit to transmit upstream communications on a first communication channel controlled by a first line unit comprises the step of commanding said first remote unit to tune itself to transmit upstream communications on a communication channel within the upstream frequency band assigned to said first line unit, and wherein said step of re-assigning said first remote unit to transmit upstream communications on a third one of said communication channels controlled by a second one of said line units comprises the step of commanding said first remote unit to tune itself to transmit upstream communications on a communication channel within the upstream frequency band assigned to said second line unit.

10. A method for protection switching of a communications system, for use with head end equipment including a plurality of lien units (CLUHs) each controlling a respective set of communication channels carried over a communications medium, and for use further with a plurality of remote units (CTUs) each connected to said communications medium, comprising the steps of:

assigning first and second ones of said remote units to communicate on first and second respective communication channels both controlled by a first one of said line units; and subsequently re-assigning said first remote unit to communicate on a third one of said communication channels controlled by a second one of said line units in response to detection of a predefined level of quality reduction in said first communication channel without, in response to said detection of a predefined level of quality reduction in said first communication channel, re-assigning said second remote unit to communicate on any of the communication channels controlled by said second line unit;

wherein said communications medium is anrf communications medium, wherein each of said line units are assigned a respective set of at least one frequency band for communications with remote units, all of the communication channels in the set of communication channels controlled by each given one of said line units being carried within the frequency bands assigned to the given line unit, wherein said step of assigning a first remote unit to communicate on a first communication channel controlled by a first line unit includes the step of commanding said first remote unit to tune itself to communicate on a communication channel within one of the frequency bands assigned to said first line unit, and wherein said step of re-assigning said first remote unit to communicate on a third one of said communication channels controlled by a second one of said line units includes the step of commanding said first remote unit to tune itself to communicate on a communication channel within one of the frequency bands assigned to said second line unit.

* * * * *